US011919633B2

(12) United States Patent
Bianco Mengotti et al.

(10) Patent No.: US 11,919,633 B2
(45) Date of Patent: Mar. 5, 2024

(54) CONVERTIPLANE

(71) Applicant: LEONARDO S.P.A., Rome (IT)

(72) Inventors: Riccardo Bianco Mengotti, Samarate (IT); Carlo Cassinelli, Samarate (IT); Alessandro Scandroglio, Samarate (IT); Andrea Bavetta, Samarate (IT); Paolo Brughera, Samarate (IT); Luca Sampugnaro, Samarate (IT)

(73) Assignee: LEONARDO S.P.A., Rome (IT)

( * ) Notice: Subject to any disclaimer, the term of this patent is extended or adjusted under 35 U.S.C. 154(b) by 119 days.

(21) Appl. No.: 17/786,170

(22) PCT Filed: Dec. 17, 2020

(86) PCT No.: PCT/IB2020/062120
§ 371 (c)(1),
(2) Date: Jun. 16, 2022

(87) PCT Pub. No.: WO2021/124207
PCT Pub. Date: Jun. 24, 2021

(65) Prior Publication Data
US 2023/0025666 A1 Jan. 26, 2023

(30) Foreign Application Priority Data

Dec. 17, 2019 (EP) .................................... 19217205

(51) Int. Cl.
*B64C 29/00* (2006.01)
*B64C 1/20* (2006.01)
(Continued)

(52) U.S. Cl.
CPC ............ *B64C 29/0033* (2013.01); *B64C 1/20* (2013.01); *B64C 1/22* (2013.01); *B64C 3/52* (2013.01);
(Continued)

(58) Field of Classification Search
CPC ......... B64C 29/0033; B64C 1/20; B64C 1/22; B64C 3/52; B64C 9/14; B64C 27/22;
(Continued)

(56) References Cited

U.S. PATENT DOCUMENTS 5,046,684 A 9/1991 Wolkovitch
5,839,691 A 11/1998 Lariviere
(Continued)

FOREIGN PATENT DOCUMENTS

EP 0084686 B 8/1983
EP 1057724 A2 12/2000
EP 2778063 A1 9/2014

OTHER PUBLICATIONS

International Search Report and Written Opinion in corresponding International Patent Application No. PCT/IB2020/062120 dated Feb. 19, 2021 (15 pages).

(Continued)

*Primary Examiner* — Valentina Xavier
(74) *Attorney, Agent, or Firm* — Leason Ellis LLP

(57) ABSTRACT

A convertiplane is described that comprises a fuselage, having a first longitudinal axis, with a nose and a tail portion; a pair of wings arranged on respective opposite sides of said fuselage, carrying respective rotors; a pair of engines operatively connected to respective said rotors; at least one first lifting surface arranged on said tail portion; and a pair of canards arranged on said nose of said fuselage and defining respective second lifting surfaces adapted to generate a third lift/negative lift value; each rotor comprising a mast rotatable about a second axis and about an relative third axis transversal to said second axis and with respect to the fuselage, so as to set said convertiplane between a helicopter configuration and an aeroplane configuration; each second axis, in use, being transversal to the first axis of said (Continued)

convertiplane in said helicopter configuration and being parallel to said first axis in said aeroplane configuration.

17 Claims, 16 Drawing Sheets

(51) Int. Cl.
| | |
|---|---|
| *B64C 1/22* | (2006.01) |
| *B64C 3/52* | (2006.01) |
| *B64C 9/14* | (2006.01) |
| *B64C 27/22* | (2006.01) |
| *B64C 39/12* | (2006.01) |
| *B64D 27/24* | (2006.01) |
| *B64D 29/00* | (2006.01) |
| *B64D 35/04* | (2006.01) |
| *B64D 35/08* | (2006.01) |
| *B64D 27/02* | (2006.01) |

(52) U.S. Cl.
CPC ............... *B64C 9/14* (2013.01); *B64C 27/22* (2013.01); *B64C 39/12* (2013.01); *B64D 27/24* (2013.01); *B64D 29/00* (2013.01); *B64D 35/04* (2013.01); *B64D 35/08* (2013.01); *B64D 2027/026* (2013.01)

(58) Field of Classification Search
CPC ........... B64C 39/12; B64C 27/28; B64C 3/56; B64D 27/24; B64D 29/00; B64D 35/04; B64D 35/08; B64D 2027/026; B64D 27/12; B64D 27/14; Y02T 50/10; Y02T 50/60
See application file for complete search history.

(56) References Cited

U.S. PATENT DOCUMENTS

| | | |
|---|---|---|
| 10,011,349 B2 | 7/2018 | Ivans et al. |
| 2011/0168835 A1* | 7/2011 | Oliver .................. B64D 27/06 244/12.4 |
| 2019/0135423 A1 | 5/2019 | Groninga et al. |

OTHER PUBLICATIONS

International Preliminary Report on Patentability in corresponding International Patent Application No. PCT/IB2020/062120 dated Mar. 7, 2022 (8 pages).
Written Opinion of the International Preliminary Examining Authority in corresponding International Patent Application No. PCT/IB2020/062120 dated Apr. 14, 2021 (8 pages).

* cited by examiner

CONVERTIPLANE

CROSS-REFERENCE TO RELATED APPLICATIONS

This patent application is a U.S. National Phase Application under 35 U.S.C. § 371 of International Patent Application No. PCT/IB2020/062120, filed on Dec. 17, 2020, which claims priority from European patent application no. 19217205.4 filed on Dec. 17, 2019, the entire disclosure of which is incorporated herein by reference.

TECHNICAL FIELD

The present invention relates to a convertiplane.

BACKGROUND ART

In the aviation industry, aeroplanes are normally used for high cruising speeds, in particular above 150 knots and at high altitudes, for example above 30,000 feet. For high cruising speeds and altitudes, aeroplanes use fixed wings to generate the lift necessary for sustaining the aeroplane in the air. A sufficient amount of such lift can only be achieved by accelerating the aeroplane on relatively long runways. These runways are also needed to allow aeroplanes to land.

Contrariwise, helicopters normally have lower cruising speeds than aeroplanes and generate the necessary lift through rotation of the main rotor's blades. In consequence, helicopters can take-off/land without the need for horizontal speed and using particularly small surfaces. Moreover, helicopters are capable of hovering and of flying at relatively low altitudes and speeds, thereby being particularly easy to handle and suitable for demanding manoeuvres, such as mountain or sea rescue operations.

Nevertheless, helicopters have intrinsic limits regarding the maximum operating altitude, which is around 20,000 feet and the maximum operating speed, which cannot exceed 150 knots.

In order to meet the demand for aircrafts capable of having the same manoeuvrability and flexibility of use of the helicopter and, at the same time, overcome the intrinsic limits indicated above, convertiplanes are known.

An example of a convertiplane is described in the U.S. Pat. No. 10,011,349.

In greater detail, the convertiplane described in the aforementioned application basically comprises:
  a fuselage extending along a first longitudinal axis;
  a wing projecting in a cantilever fashion and formed by a pair of wings arranged on respective opposite sides of the fuselage and having respective free ends opposite to the fuselage and aligned along a second transversal axis substantially orthogonal to the first longitudinal axis; and
  a V-shaped tail portion projecting from the fuselage in a rearward position with respect to the wing.
  The convertiplane also comprises:
  a pair of nacelles housing the respective engines; and
  a pair of rotors rotatable about respective third axes and operatively connected to the respective engines.

The rotors are tiltable with respect to the wing about a fourth axis, preferably parallel to the second axis.

Each rotor comprises, in a known manner, a mast rotatable about the relative third axis and a plurality of blades hinged on the mast, in particular angularly equispaced along the circumference around the free end of the mast that protrudes from the respective nacelle.

More in particular, the blades of each rotor extend along respective longitudinal axes, which are transversal to the relative third axis.

The rotors are connected together by an interconnection shaft, which ensures the operation of both the rotors in the event of failure of one of the engines. Furthermore, the engines are carried on respective wings mutually opposite to each other with respect to the fuselage.

More in particular, the engines are arranged with the respective rotors, i.e. at the same distance of the respective rotors with respect to the fuselage.

In the embodiment described in the abovementioned application, the engines are fixed with respect to the fuselage and the wings.

In consequence, the convertiplane described in the abovementioned patent application comprises a pair of transmissions, each interposed between a respective engine and the respective rotor.

In particular, each transmission comprises a fixed part connected to the respective engine and a movable part connected to the respective rotor.

Convertiplanes are also able to selectively assume:
  an "aeroplane" configuration, in which the rotors are arranged with respective third axes substantially parallel to the first axis of the convertiplane and coaxial to the respective engines; or
  a "helicopter" configuration, in which the rotors are arranged with the respective third axes substantially vertical and transversal to the first axis of the convertiplane and orthogonal to the respective engines.

Due to the possibility of tilting the rotors, convertiplanes are able to take-off and land like a helicopter, i.e. in a direction substantially perpendicular to the first longitudinal axis of the convertiplane, without the need of a runway.

Furthermore, convertiplanes are able to take-off and land on rough terrain or ground not normally prepared for such manoeuvres.

In addition, convertiplanes are capable of hovering when in the "helicopter" configuration.

Convertiplanes can also reach and maintain cruising speeds of approximately 250-300 knots and flight altitudes of up to approximately 20,000 feet when in the "aeroplane" configuration.

This cruising speed is much higher than the value of roughly 150 knots defining the maximum cruising speed of the helicopters.

Similarly, the abovementioned altitude is much higher than that typical of helicopters and enables convertiplanes in the "aeroplane" configuration to avoid the clouds and bad weather conditions typical of lower altitudes.

Known types of convertiplanes take-off and land in the "helicopter" configuration, as the diameter of the rotors is such that they would strike the ground in the "aeroplane" configuration. This is due to the fact that the rotors of the convertiplanes must have a sufficiently large diameter in order to allow the convertiplane to hover in the "helicopter" configuration.

Since it can never land/take-off in the "aeroplane" configuration, the requirements of the convertiplane are substantially different from those of an aeroplane.

In fact, the wing of the convertiplane does not need to generate the lift necessary to counteract its weight in low-speed conditions typical of landing/take-off and, therefore, have a smaller wingspan with respect to that of an aeroplane of the same weight.

Furthermore, known types of convertiplanes only have two aerodynamic lifting surfaces, which are defined by the wing and the tail portion.

These aerodynamic surfaces generate respective lift forces, which must ensure the longitudinal balance of the convertiplane, i.e. level flight with neither a nose-up nor nose-down attitude, in all flight conditions and for all actual weight values of the convertiplane.

In climbing/descent conditions of the convertiplane, the abovementioned respective lift forces are such as to ensure a desired attitude and angle of balance.

The abovementioned condition of longitudinal balance occurs when the algebraic sum of the lift/negative lift forces generated by the wing and by the tail portion balance the actual weight, while the sum of the moments generated by these lift/negative lift forces with respect to the barycentre of the convertiplane is null.

From the foregoing, it follows that satisfying the condition of balance is only possible when the surfaces of the wings and the tail portion provide respective lift/negative lift values unequivocally determined by the actual weight of the convertiplane during the mission.

More specifically, the greater (lesser) the actual weight of the convertiplane, the greater (lesser) the lift that must be generated by the wing.

Due to the foregoing, it is not possible to optimise the aerodynamic efficiency, namely the ratio between lift and resistance, of the wing when the convertiplane is in forward flight in the "aeroplane" configuration. In other words, it is not possible to configure the wing with a lift coefficient corresponding to the point of maximum aerodynamic efficiency.

This is because the continual variation in weight and speed of the convertiplane requires changing the lift coefficient of the wing via the use of flaps and, in consequence, the lift value generated by the wings.

In conventional aeroplanes, as take-off and landing take place at low speeds, it is necessary to make the wing with a wingspan greater than the optimal value for cruising, to allow increasing the overall lift developed by the wings through a corresponding increase in the surface of the wing.

There is awareness in the industry of the need to facilitate the use of wings with smaller chord and wingspan, so as to reduce the overall dimensions of the convertiplane, optimise the take-off/landing phases in the "helicopter" configuration by exposing the smallest possible wing surface to the downwash of the rotor(s) and, at the same time, optimise as far as possible the aerodynamic behaviour of the wing in the "aeroplane" configuration and in cruising conditions.

There is also awareness of the need to maximise the aerodynamic efficiency of the wings in the "aeroplane" configuration and, at the same time, reduce as far as possible interference with the downwash of the rotors in the "helicopter" configuration.

There is awareness in the industry of the need to ensure the maximum survivability of the convertiplane in particularly severe operating scenarios. In greater detail, there is awareness of the need to have a certain redundancy in the aerodynamic surfaces of the convertiplane so that they can compensate, in the event of, the partial loss of one of them.

There is also awareness in the industry of the need to reduce as far as possible the length of the interconnection shaft and, at the same time, reduce the flexural loads acting on the wing.

There is awareness in the industry of the need to reduce as far as possible the aerodynamic resistance caused by the geometric discontinuities associated with the fuselage-wing and wing-engine interfaces.

There is also awareness in the industry of the need to limit the external installation of loads or further equipment on the convertiplane, to avoid increases in aerodynamic resistance or interference effects.

EP-B-0084686 describes a traditional aeroplane basically comprising:
a fuselage;
a wing mounted on the fuselage;
a pair of canards mounted on the fuselage, in front of the wings, in a cantilever fashion; and
a vertical fin mounted on the fuselage and on which a horizontal tailplane is mounted.

The traditional aeroplane described in EP-B-0084686 also comprises a pair of "pusher" propellers arranged behind the trailing edge of the wing and designed to provide the aeroplane with the necessary thrust value.

The implemented configuration of this aeroplane is totally inapplicable to convertiplanes for the following reasons.

Firstly, the application of pusher propellers to the convertiplane would require rotating these propellers beneath the wing in the "helicopter" configuration, generating a considerable risk for the operators on the ground during take-off/landing conditions.

Secondly, the aeroplane described in EP-B-0084686 has, in the traditional manner, a wing with a particularly large wingspan, which would be oversized for a convertiplane.

This is because said wing must be able to balance the weight of the aeroplane in low-speed conditions typical of take-off/landing and must, therefore, have certain wingspan and chord values.

Furthermore, the wings of the aeroplane such as the one described above generally require the installation of particularly sophisticated and complex flaps, in order to further increase the lift coefficient of the wing and develop the lift necessary for sustaining flight in low-speed conditions.

DISCLOSURE OF INVENTION

The aim of the present invention is the manufacture of a convertiplane that enables to satisfy at least one of the above-specified needs in a simple and inexpensive manner.

According to the invention, this aim is achieved by a convertiplane as claimed in claim 1.

BRIEF DESCRIPTION OF THE DRAWINGS

For a better understanding of the present invention, three non-limitative preferred embodiments are described hereinafter, purely by way of example and with the aid of the accompanying drawings, in which.

BEST MODE FOR CARRYING OUT THE INVENTION

Figure 1:
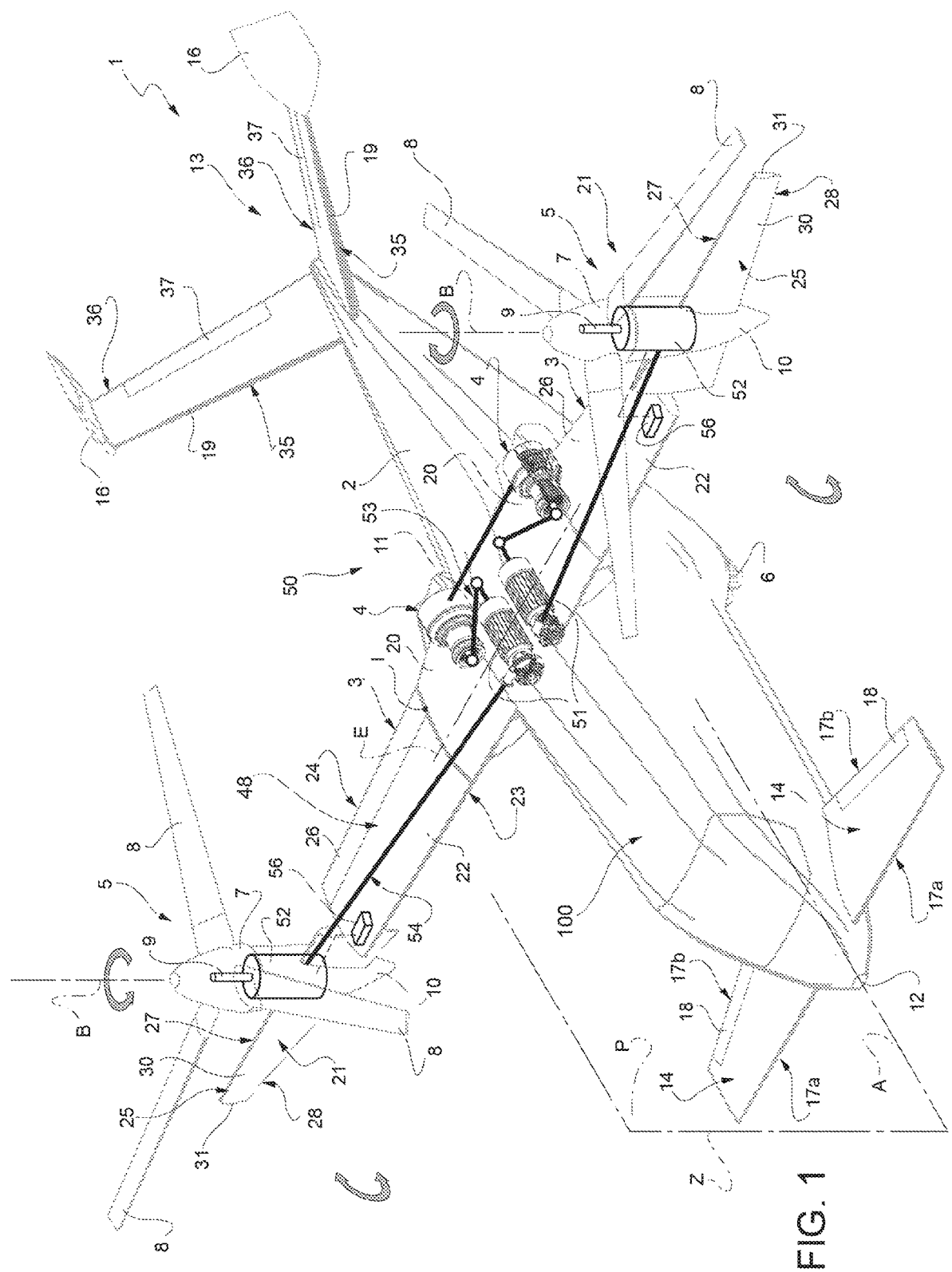
FIG. 1 is a perspective view of a first embodiment of a convertiplane made according to the dictates of the present invention and arranged in the "helicopter" configuration.

Referring to FIGS. 1 to 9, reference numeral 1 indicates an aircraft capable of hovering, in particular a convertiplane.

It should be noted that hereinafter in this description, terms such as "above", "below", "at the front", "at the rear" and the like are used with reference to forward flight or hovering conditions of the convertiplane 1 shown in FIGS. 1 and 2.

The convertiplane 1 basically comprises:
- a fuselage 2 having an axis A of longitudinal extension;
- a pair of wings 3 extending in a cantilever fashion from respective mutually opposite sides of the fuselage 2 and transversely to the axis A;
- a pair of engines 4 carried by respective wings 3 and each arranged at the intersection of the relative wings 3 with the fuselage 2; and
- a pair of rotors 5 operatively connected to respective engines 4 and rotatable about respective axes B.

The convertiplane 1 further comprises a pair of nacelles 10 housing respective rotors 5.

The convertiplane 1 further comprises a plurality of undercarriages 6 arranged below the fuselage 2 with reference to a normal operating position of the convertiplane 1 shown in FIG. 2.

The convertiplane 1 further comprise an axis E.

In the case shown, the axis E is orthogonal to the axis A and arranged horizontally in a plan view of the convertiplane 1.

Alternatively, the convertiplane comprises a pair of axes E associated with respective wings 3. Each axis E is parallel to a median line of the relative wings 3 and could form a dihedral with respect to the fuselage 2.

Each wing 3 develops a lift having a main component along an axis Z orthogonal to the axes A and E.

By tilting the rotors 5 about the axis E, the convertiplane 1 can be selectively arranged:
- in a "helicopter" configuration (shown in FIG. 1), in which the axes B of the rotors 5 are orthogonal to the axis A and the axis E; and
- in an "aeroplane" configuration (shown in FIG. 2), in which the axes B of the rotors 5 are parallel to the axis A and orthogonal to the axis E.

The wings 3 are arranged above the fuselage 2.

Each wing 3 basically comprises:
- a leading edge 23 and a trailing edge 24 opposite to each other; and
- a control surface 26 movable with respect to the wing 3.

Each wing 3 also comprises a top surface 48 and a bottom surface 49 opposite to each other and both extending between the leading edge 23 and the trailing edge 24.

In particular, each top surface 48 delimits the respective wing 3 from above, i.e. on the side opposite to the relative undercarriage 6. Each bottom surface 49 delimits the respective wing 3 from below, i.e. on the side of the relative undercarriage 6.

The median line of each wing 3 is equispaced from the respective leading edge 23 and trailing edge 24.

The control surfaces 26 are arranged on the side of the trailing edge 24 of the relative wings 3.

Each control surface 26 is hinged to the respective wing 3.

When the convertiplane 1 is in the "aeroplane" configuration (FIG. 2), each control surface 26 is normally arranged in a neutral position, in which it defines respective extensions of the top surface 48 and the bottom surface 49 of the relative wing 3.

Furthermore, the control surface 26 is selectively movable starting from the neutral position to a first raised operating position and a second lowered operating position.

Preferably, the control surfaces 26 are controlled so as to be arranged with one in the related first raised position and the other appendage in the related second lowered operating position. In this way, a roll moment is generated about the axis A on the aircraft 1.

When the convertiplane 1 is in the "helicopter" configuration (FIG. 1), each movable control surface 26 is arranged in a third lowered operating position. In this way, the interference of the wings 3 with the downwash of the rotors 5, in the "helicopter" configuration, is reduced.

Each second lowered operating position is interposed between the respective neutral position and third lowered operating position.

Alternatively, each lowered operating position coincides with the third lowered operating position.

In the case shown, each engine 4 is interposed between the fuselage 2 and the rotor 5 along the relative wing 3.

More specifically, each engine 4 is arranged at a connection interface between a relative side of the fuselage 2 and the relative wing 3.

In particular, each engine 4 is arranged below the respective wing 3 and laterally to the fuselage 2 of the convertiplane 1.

Alternatively, and in a manner not shown, each wing 3 of the convertiplane 1 has at least one engine 4 installed on the top surface 48.

Alternatively, and in a manner not shown, each wing 3 of the convertiplane 1 has at least one engine 4 installed on the bottom surface 49.

Alternatively, and in a manner not shown, the fuselage 2 of the convertiplane 1 has at least one engine 4 installed on its own top surface 100 and on a longitudinal plane P of symmetry of the convertiplane 1.

Alternatively, and in a manner not shown, at least one engine is housed at least partially inside the fuselage 2, preferably on a longitudinal plane P of symmetry of the convertiplane 1.

Figure 2:
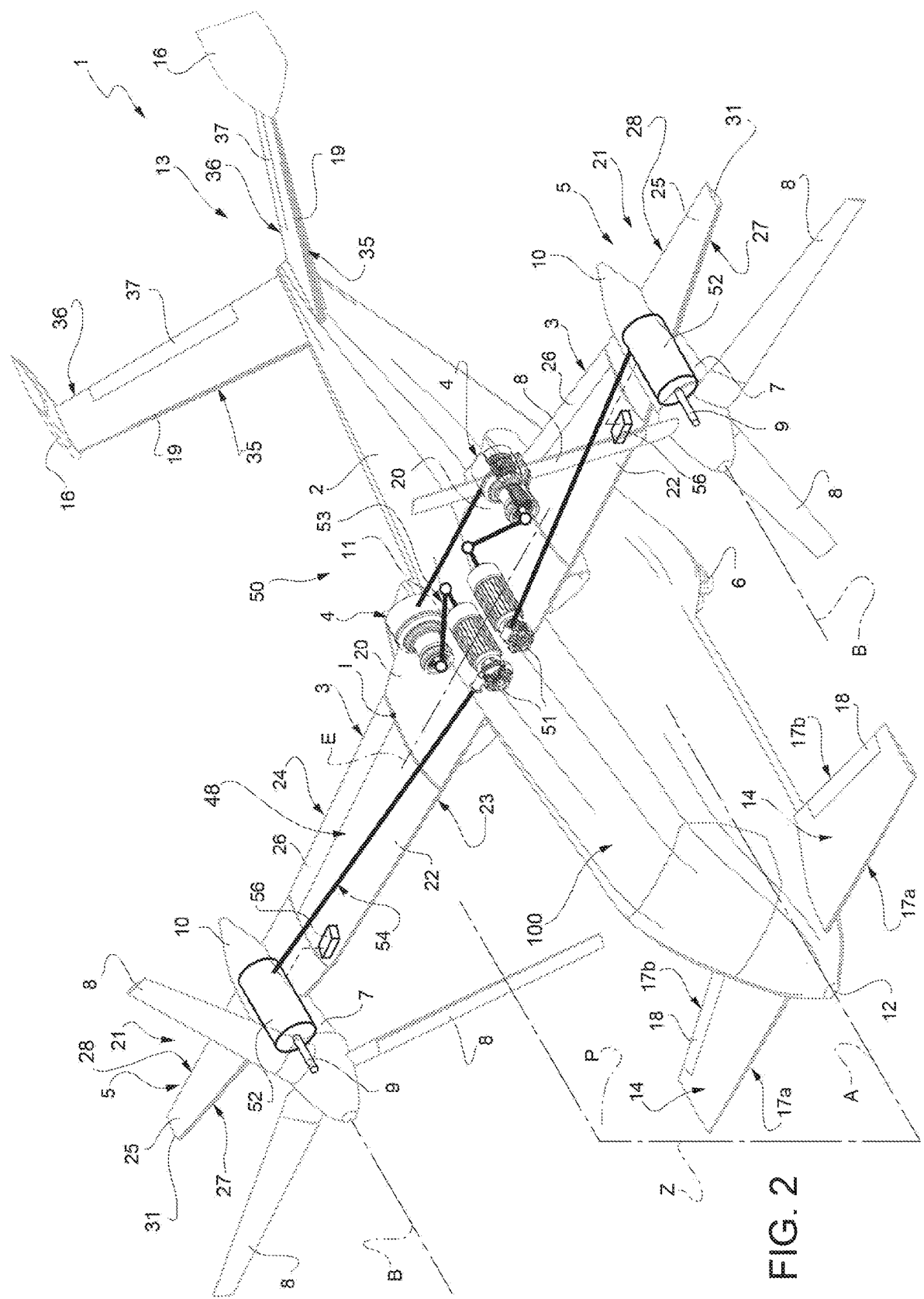
FIG. 2 is a perspective view of the convertiplane of FIG. 1 in the "aeroplane" configuration.
Figure 3:
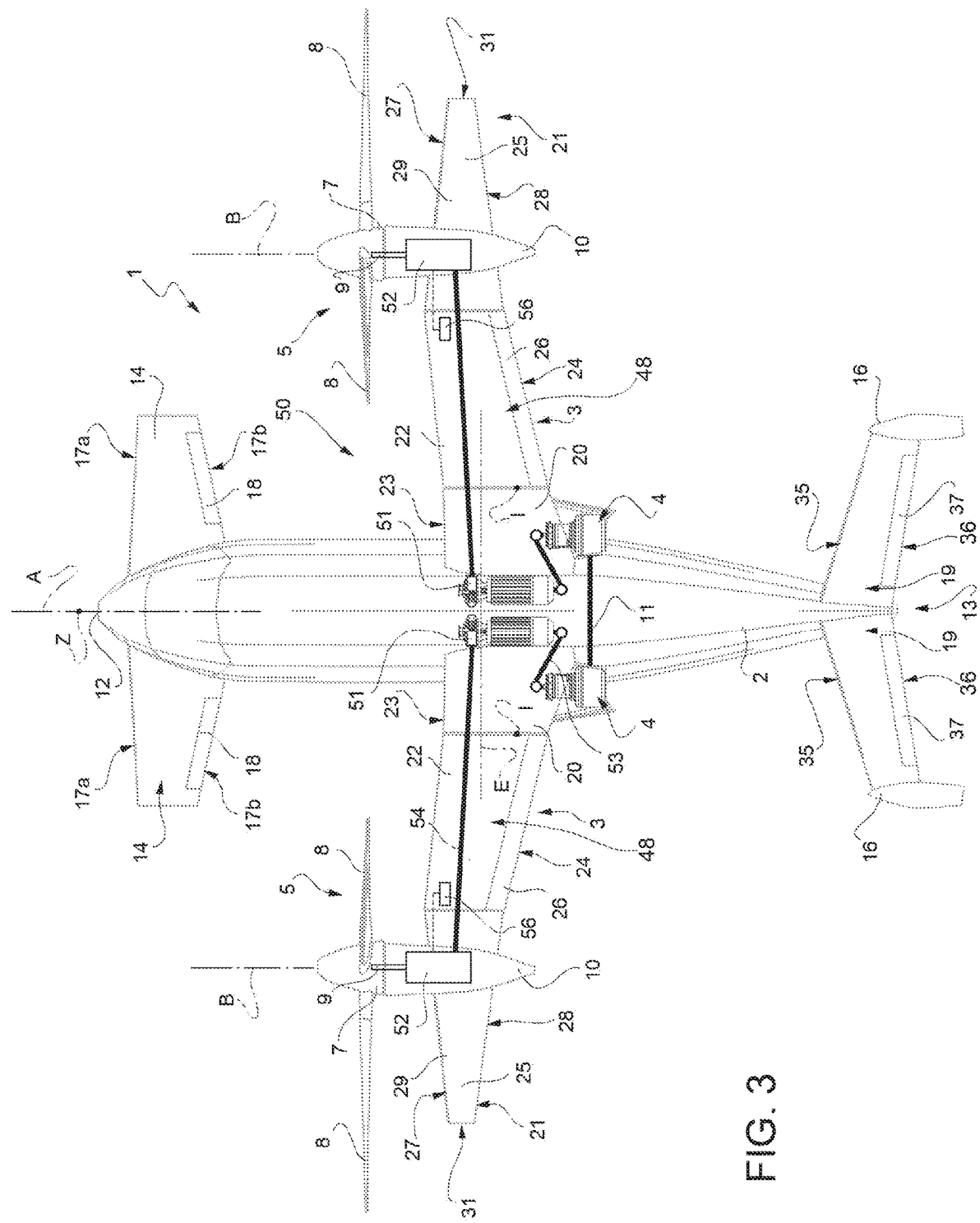
FIG. 3 is a plan view of the convertiplane of FIGS. 1 and 2 in the "aeroplane" configuration.

The plane P is parallel to the axes A and Z and orthogonal to the axis E (FIGS. 1 and 2).

The convertiplane 1 also comprises an interconnection shaft 11, which enables the mechanical power connection between each engine 4 and the rotors 5 to ensure the operation of both rotors 5 in the event of failure of one of the engines 4. The interconnection shaft 11 is shown in the accompanying figures by way of non-limiting example. Preferably, the interconnection shaft 11 is arranged in the fuselage 2 for the greater part of its length.

More specifically, the interconnection shaft 11 extends along its own axis orthogonal to the axis A and parallel to the axis E.

The fuselage 2 also comprises a nose 12 arranged at the front and a tail portion 13, opposite each other along the axis A.

In the preferred embodiment of the present invention, the tail portion 13 of the convertiplane 1 also comprises a pair of surfaces 19 arranged in a V, tilted towards each other and symmetrical with respect to the axis A.

Each surface 19, in turn, comprises a fin 16 transversal to the respective surface 19, orthogonal in the case shown, and extending from both sides of the respective surface 19.

Preferably, the surfaces 19 define an angle between them ranging from 40 to 50 degrees, even more preferably 45 degrees.

In this way, the surfaces 19 of the convertiplane 1 develop a substantial aerodynamic force along the axis Z. This aerodynamic force provides lift or negative lift.

Alternatively, through a different combination of the surfaces 19 with respective fins 16, the tail portion 13 can be shaped like a H, M, T or cross.

In particular, the size of the projection in plan of the tail portion 13, independently of its geometric shape, is equal to at least 5%, preferably 10%, of the overall size of the wing 3 parallel to the axis E and seen from above in plan. In this way, in the "aeroplane" configuration of the convertiplane 1, the tail portion 13 contributes significantly to the balance and to the longitudinal stability of the convertiplane 1.

Each surface 19 comprises, in particular:
a respective leading edge 35 and a respective trailing edge 36 opposite to each other; and
a respective movable appendage 37 arranged on the respective trailing edge 36.

Preferably, the tail portion 13 is configured to generate a lift or negative lift on the convertiplane 1, i.e. a force directed upwards/downwards and acting against/with the weight force, as necessary in order to obtain the balance, stability and controllability of the convertiplane 1.

In particular, the rotors 5 are of the "puller" type.

In the "aeroplane" configuration, the rotors 5 are arranged in front of the leading edges 23 of the wings 3 and towards the nose 12.

In the "helicopter" configuration, the rotors 5 are arranged above the wings 3 and on the opposite side of the undercarriage 6.

Each wing 3 comprises:
a portion 20 extending along the axis E orthogonal to the axis A and fixed with respect to the fuselage 2;
a tip portion 21 supporting the respective rotor 5 and the respective nacelle 10, and defining an aerodynamic surface 25; and
an intermediate portion 22, which is interposed between the respective portion 20 and the respective tip portion 21.

Each portion 20 supports the relative engine 4.

In the case shown, each tip portion 21, the relative surface and the relative rotor 5 are tiltable about the axis E integrally with the relative rotor 5, preferably by an angle ranging between 5 and 10 degrees.

The intermediate portion 22 of each wing 3 is hinged to the relative portion 20 about a respective axis I, and is movable with respect to the relative portion 20 integrally with the respective portion 21 during the transformation of the convertiplane 1 from the "helicopter" configuration to a stowage configuration, which is not shown. In this way, it is possible to fold the respective wing 3 about the respective axis I, also during a step of removing equipment from the wings 3.

In the case shown, the axes I are incident in the longitudinal plane P, which is parallel to the axes A and Z and orthogonal to the axis E.

In particular, the axes I are convergent to one another on the opposite side of the fuselage 2 with respect to the undercarriages 6.

Alternatively, the axes I are convergent to one another on the side of the undercarriages 6 with respect to the fuselage 2.

In one embodiment that is not shown, the axes I are skew to facilitate folding of the wings 3 one over the other.

In a further embodiment that is not shown, the axes I are parallel to each other.

Each portion 20 and the respective intermediate portion 22 are integral with each other and extend along the axis E when the convertiplane 1 is in the "helicopter" configuration, in the "aeroplane" configuration and during the transition of the convertiplane 1 between the "helicopter" configuration and the "aeroplane" configuration.

Each tip portion 21 comprises a respective free end 31.

In greater detail, each tip portion 21 comprises, proceeding from the respective portion 22 from the side opposite to the axis A and along the axis E in the "aeroplane" or "helicopter" configurations, a section adjacent to the respective portion 22, the respective rotor 5 with the respective nacelle 10 and the respective free end 31.

When the convertiplane 1 is in the "aeroplane" configuration, the surfaces 25 define respective extensions of the respective portions 20 and the respective intermediate portions 22.

In this "aeroplane" configuration, a leading edge 27 of each surface 25 is arranged at the in front of the trailing edge 28 of the same surface 25, proceeding along the axis A.

In this way, the chord of the surfaces 25 is arranged substantially parallel to the axis A.

The tip portions 21 and the respective surfaces 25 present a minimum overall surface area comprising respective leading edges 27, 28 parallel to the axis A, and a maximum overall surface area defined by the respective top surface and bottom surface 29, 30 orthogonal to the axes A and E.

It is important to stress that when the convertiplane 1 is arranged in the "aeroplane" configuration, preferably, the tip portions 21 can be rotated about the axis E and tilted with respect to the axis A by a predetermined angle with respect to the relative wings 3 and rotors 5. In this way, it is possible to further vary the lift developed by the wings 3 without varying the lift coefficient of the wings 3.

Contrariwise, in the "helicopter" configuration, the leading edges 27 and trailing edge 28 are arranged orthogonally to the axis A and E. In this way, the chord of the surfaces 25 is arranged substantially orthogonal to the axes A and E and the interference of the surfaces 25 with the downwash of the respective rotors 5 is reduced.

Each surface 25 also comprises a top surface 29 and a bottom surface 30 extending from mutually opposite sides between the respective leading edges 27 and trailing edges 28.

The top surface 29 and bottom surface 30 are arranged orthogonally to the axis A when the convertiplane 1 is in the "helicopter" configuration.

More specifically, the leading edge 27 of each surface 25 is arranged above the respective trailing edge 28.

In one embodiment that is not shown, the surfaces 25 comprise respective movable appendages.

Each rotor 5 basically comprises:
a mast 9 rotatable about an axis B;
a hub 7 driven in rotation by the mast 9; and
a plurality of blades 8 hinged on the hub 7.

The axis E is transversal to the axis A and the axes B.

Since the rotors 5 are identical, reference will be made hereinafter to a single rotor 5.

Advantageously, the convertiplane 1 also comprises a pair of canards 14 arranged on the nose 12 of the fuselage 2 and defining respective surfaces designed to generate lift.

In greater detail, the canards 14 project in a cantilever fashion from respective mutually opposite sides of the fuselage 2.

In the case shown, the canards 14 are arranged on a lower portion of the nose 12.

In a different embodiment of the present invention, not shown in the accompanying figures, the canards 14 are arranged on an upper portion of the nose 12 of the convertiplane 1.

Preferably, the canards 14 are configured so as to generate a lift with a main component along the axis Z and counter the weight of the convertiplane 1.

Each canard 14 also comprises:
a respective leading edge 17a and a respective trailing edge 17b opposite to each other; and
a respective movable appendage 18 arranged on the respective trailing edge 17b.

The canards 14, the wings 3 and the tail portion 13 are arranged at progressively increasing distances from the undercarriage 6, proceeding from the nose 12 towards the tail portion 13.

Each engine 4 is housed (FIG. 8) in a casing 40.

The casing 40 is connected to a respective lateral side of the fuselage 2 and to the bottom surface 49 of the respective wing 3, in greater detail to the bottom surface portion 49 of the relative portion 20 of said wing 3.

In greater detail, the casing 40 of each engine 4 is formed by:
a pair of surfaces 41, 42 opposite each other and respectively arranged above and below; and
a pair of surfaces 43, 44 opposite each other, extending between the surfaces 41, 42, and respectively arranged on the side of the fuselage 2 and on the side of the respective rotor 5.

The casing 40 of each engine 4 also defines an air intake 46 for airflow and an exhaust 47 opposite to the air intake 46 in a direction substantially parallel to the axis A.

The surface 41 is connected to the bottom surface 45 of the respective wing 3.

The surface 43 is connected to the fuselage 2.

Preferably, the surface 43 next to the fuselage 2 has a connection portion shaped so as to form a kind of recess 101 developing mainly with respect to the axis A.

Each recess 101 enables improving the airflow in a typically critical area of the convertiplane 1 such as the connection area between the respective wing 3, fuselage 2 and air intake in particular, to avoid or minimise taking boundary-layer flow into the air intake. The shape of the casing 40, in particular the air intake 46 and/or exhaust duct 47, enables minimising visible trails in the infrared spectrum of the engine 4 during the flight of the convertiplane 1.

The convertiplane 1 may also comprise a hybrid propulsion system 50, which transmits power from the engines 4 to the rotors 5.

More specifically, the hybrid propulsion system 50 comprises:
thermal engines 4;
a pair of electric generators 51, operatively connected to the respective engines 4 to receive mechanical power;
a pair of electric motors 52, electrically connected to the electric generators 51 to receive electric power and connected to the hubs 7 of the rotors 5;
a mechanical transmission 53 (only schematically shown in FIGS. 1 to 3 and 15), interposed between the engines 4 and the electric generators 51; and
an electric transmission 54 (only schematically shown in FIGS. 1 to 3 and 15), interposed between the electric generators 51 and the electric motors 52.

Preferably, there is also a mechanical transmission (not shown) interposed between the electric motors 52 and the respective rotor hubs 7.

In the case shown, the electric motors 52 are housed inside respective nacelles 10.

The electric generators 51 are interposed along the axis E between the engines 4. The electric generators 51 are also fixed to the fuselage 2.

Preferably, the hybrid propulsion system 50 is configured so as to allow the operation of both the electric motors 52 even in the event of failure of one of the engines 4 and/or electric generators 51 through the other one of the engines 4 and/or electric generators 51 still operating.

Furthermore, each engine 4 is sized so as to be able to supply both the electric generators 51 with sufficient mechanical power to ensure that the electric generators 51 power the electric motors 52 with sufficient electric power to enable correct operation of both rotors 5.

To this end (FIG. 15), the mechanical transmission 53 preferably comprises:
a pair of transmission units 57 interposed between one engine 4 and respective electric generators 51; and
a pair of transmission units 58 interposed between the other engine 4 and respective electric generators 51.

Each electric generator 51 is connected to both electric motors 52, and is sized so as to be able to power both electric motors 52 with a sufficient electric power to enable the correct operation of both the rotors 5.

The electric transmission 54 preferably comprises:
a pair of transmission units 67 interposed between one electric generator 51 and respective electric motors 52; and
a pair of transmission units 68 interposed between the other electric generator 51 and respective electric motors 52.

With regard to the above-described connection layout, each pair of transmission units 67 and 68 can be implemented via a single electric power connection.

The system 50 also comprises a pair of electric power sources 56 electrically connected in a selective manner to the respective electric motors 52. These sources 56 are selectively activatable so as to be able to power the respective electric motors 52 with an increase of electric power for a limited time interval, for example 30 seconds, in the event of failure of one of the engines 4/electric generators 51, so as to enable an emergency manoeuvre to be performed.

In one embodiment of the present invention, the fuselage 2 also comprises:
a cargo compartment 60; and at least one opening 61 for access to the cargo compartment 60; and a support element 70, normally housed inside the cargo compartment 60 and selectively movable through the opening 61 to the outside of the fuselage 2.

Figure 5:
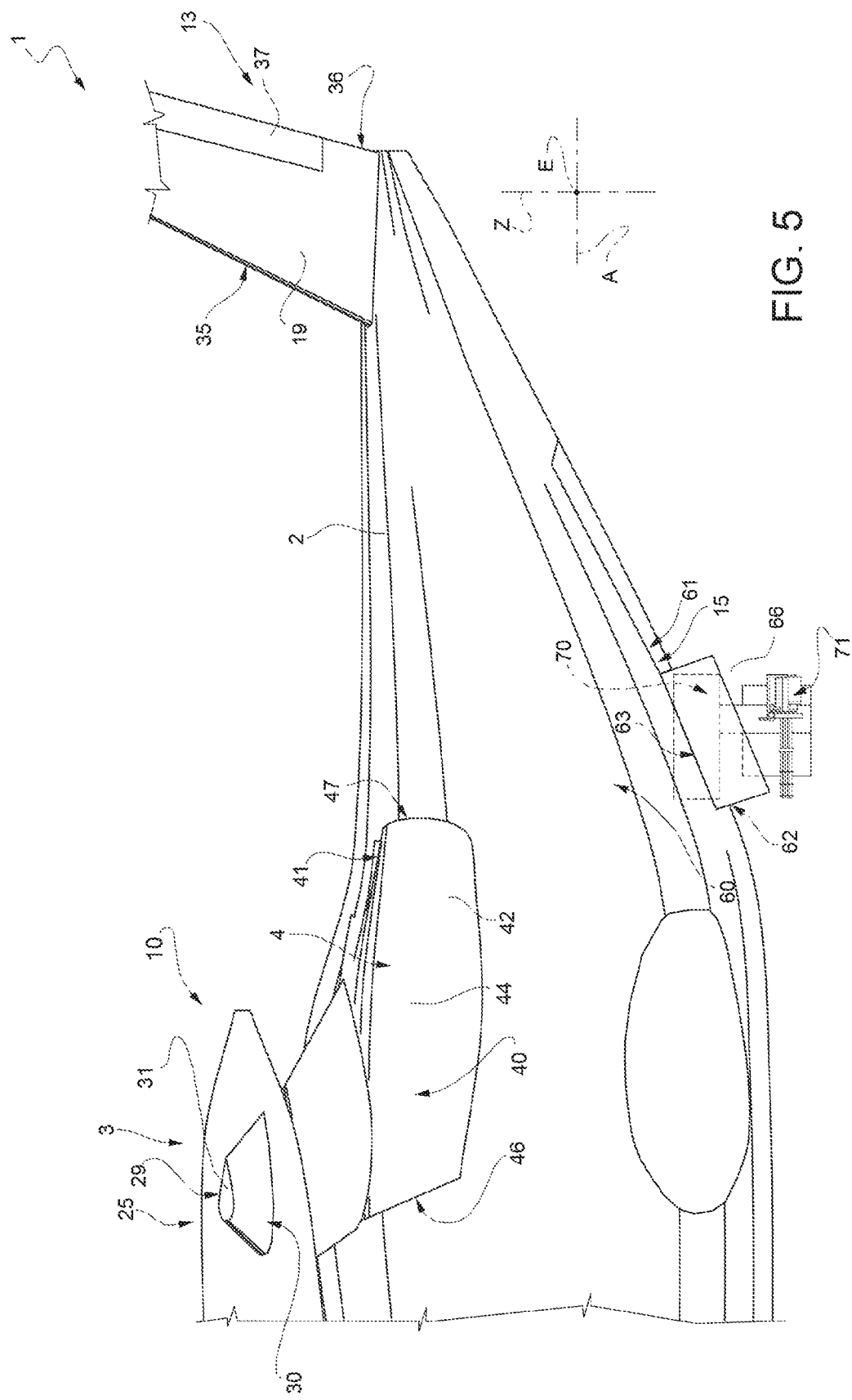
FIG. 5 shows a side view of the convertiplane of FIGS. 1 to 4 and the support apparatus in a second operating condition.

The cargo compartment 60 is arranged in a position interposed between the wings 3 and the tail portion 13 along the axis A, as shown in FIG. 5.

The opening 61 is delimited by a pair of edges 62, 63, respectively front and rear, opposite to each other and respectively arranged towards the nose 12 and the tail portion 13.

In addition, the opening 61 is delimited by a pair of lateral edges 64, 65, arranged adjacent to respective sides of the fuselage 2 and extending between the edges 62, 63.

The opening 61 is obtained in a portion 15 of the fuselage 2 extending at progressively increasing distances from the undercarriages 6, proceeding from the wings 3 towards the tail portion along the axis A.

The support element 70 defines a station 71 for weaponry or some other object.

When the support element 70 is positioned outside of the cargo compartment 60 and the fuselage 2, the station 71 is interposed between the rotors 5 along the axis E so as not to interfere with the rotors 5 along the axis A.

The convertiplane 1 comprises a pair of panels 66 hinged to respective edges 64, 65.

The panels 66 are selectively movable between:

respective closed positions, where they face each other, are coplanar and fully engage the opening 61, preventing access to the cargo compartment 60; and respective open positions, where they are arranged along respective planes parallel to and separated from each other, leaving the opening 61 completely free and allowing access to the cargo compartment 60.

In greater detail, when arranged in the respective closed positions, the panels 66 are contiguous with the fuselage 2.

Contrariwise, when arranged in the respective open positions, the panels 66 protrude in a cantilever fashion below the fuselage 2 towards the undercarriages 6.

In particular, the panels 66 replace a loading ramp and are designed to allow the entry of people and/or loading of objects inside the cargo compartment 60.

The support element 70 is constrained to the fuselage 2 inside the cargo compartment 60 such that it can slide along a straight path parallel to the axis Z between:

a retracted position (FIG. 4), where it is completely housed within the cargo compartment 60; and an extracted position (FIGS. 5, 6 and 7), where it is arranged outside of the cargo compartment 60.

The element 70 passes through the opening 61 during the travel between the retracted and extracted positions.

In use, the convertiplane 1 lands and takes-off in the "helicopter" configuration and advances in the "aeroplane" configuration.

In the "helicopter" configuration, when hovering or at low speed, the lift necessary to sustain the convertiplane 1 is provided by the rotors 5 arranged with the respective axes B orthogonal to the axes A and E.

In the "aeroplane" configuration, the lift necessary to sustain the convertiplane 1 is mainly provided by the wings 3.

The canards 14 provide a lower amount of upward lift and the tail portion 13 provides negative lift, i.e. a force directed downwards or towards the undercarriages 6.

The lift values provided by the wings 3 and by the canards 14 and the negative lift provided by the tail portion 13 are such as to allow the balancing and stability of the convertiplane 1 in any operating condition, independently of the lift value generated by the wings 3.

In fact, for each value of the convertiplane's actual weight and with a desired value of lift to be generated by the wings established, it is possible to find a pair of values for lift generated by the canards 14 and negative lift generated by the tail portion 13 such as to balance the weight of the convertiplane 1 or generate a desired resultant force parallel to the axis Z and to generate a resultant null moment with respect to the barycentre of the convertiplane 1.

It is thus possible to choose as the desired lift value the one that corresponds to an angle of attack of the wings 3 that maximises the aerodynamic efficiency of the respective wing profiles.

In the "aeroplane" configuration, the movable control surfaces are normally arranged in the respective first neutral positions and are selectively movable, one in the first raised operating position and the other in the second lowered operating position, so as to generate a roll moment directed about the axis A on the convertiplane 1. In other words, the movable control surfaces 26 behave like traditional ailerons.

In yet other words, the movable control surfaces 26 do not perform the functions of flaps in the "aeroplane" configuration.

If it is necessary to further increase the lift generated by the wings 3 without altering the angle of attack of the respective portions 20, 22 in the "aeroplane" configuration, it is possible to slightly tilt the tip portions 21, the respective surfaces 25 and the respective rotors 5 with respect to the axes E by an angle ranging between 5 and 10 degrees.

Therefore, the function normally performed by the flaps is optionally performed, at least partially, by the tilting of the tip portions 21 and surfaces 25 with respect to the axes E.

In the "helicopter" configuration, the movable control surfaces 26 are arranged in the respective third lowered operating positions, so as to reduce interference between the downwash generated by the rotors 5 and the wings 3.

The system 50 also transmits mechanical power from the engines 4 to the rotors 5.

More specifically, the engines 4 provide mechanical power to the electric generators 51 via the mechanical transmission 53. The electric generators 51 provide electric power to the electric motors 52 via the electric transmission 54. The electric motors 52 connected to the hub 7 thus drive the masts 9 in rotation about the respective axes B.

In the event of failure of one of the engines 4, the other engine 4 provides a sufficient value of mechanical power to both electric generators 5 to allow the correct operation of both rotors 5.

In the event of failure of one of the electric generators 51, the other electric generator 51 provides sufficient electric power to both electric motors 52 to allow the correct operation of both rotors 5.

In the event of failure of one of the engines 4/electric generators 51 and it becomes necessary to perform an emergency manoeuvre, the electric power source 56 is activated so as to supply the electric motors 52 with a surplus of electric power.

In the case of level flight at constant speed in the "aeroplane" configuration, it is possible to deactivate one of the engines 4, or arrange it to a minimum speed of rotation, and activate it, or increase the speed of rotation, in the event of an emergency manoeuvre.

Figure 4:
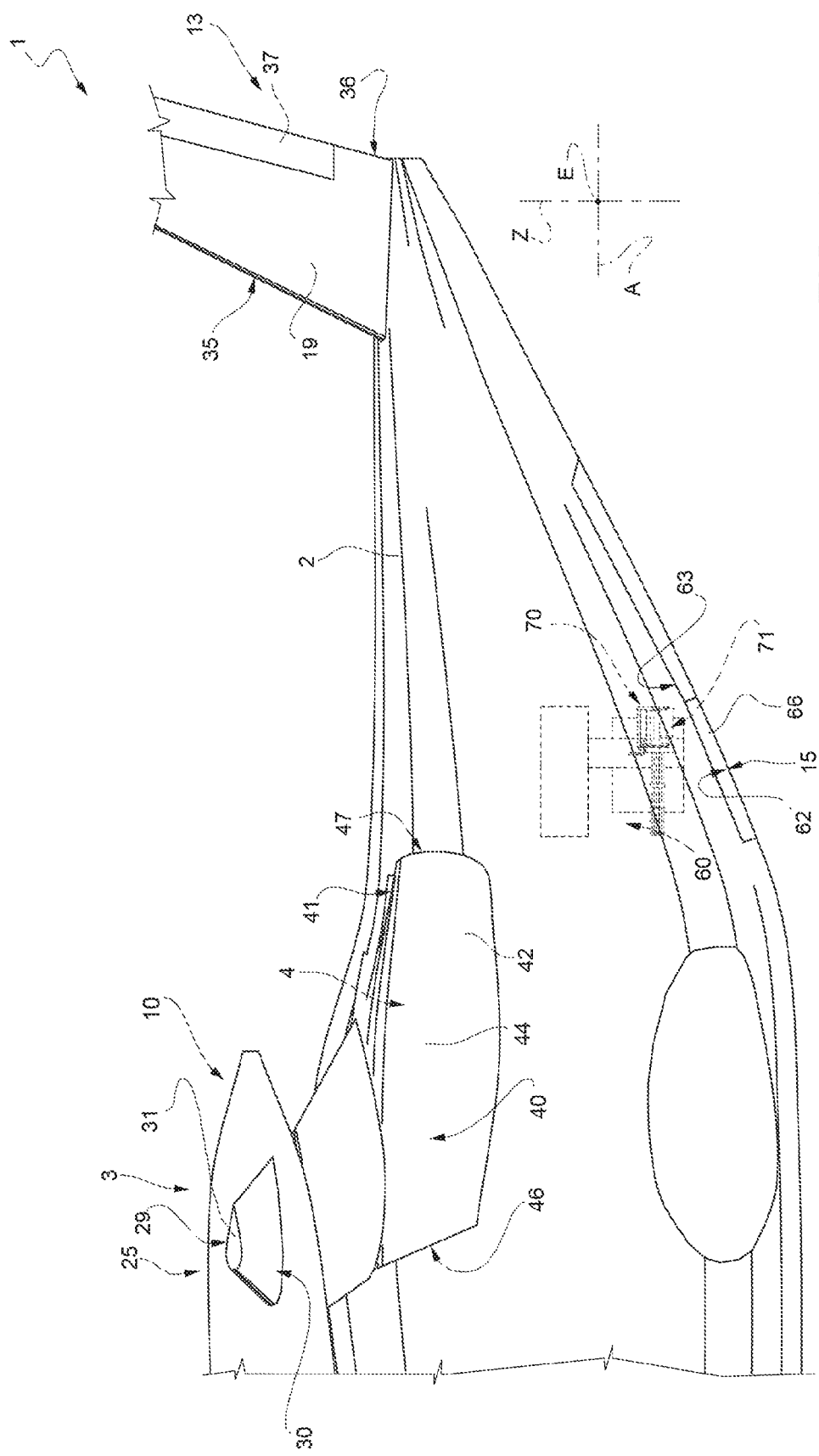
FIG. 4 is a side view, on a highly enlarged scale, of the convertiplane of FIGS. 1 to 3 according to a first embodiment, with parts removed for the sake of clarity.
Figure 8:
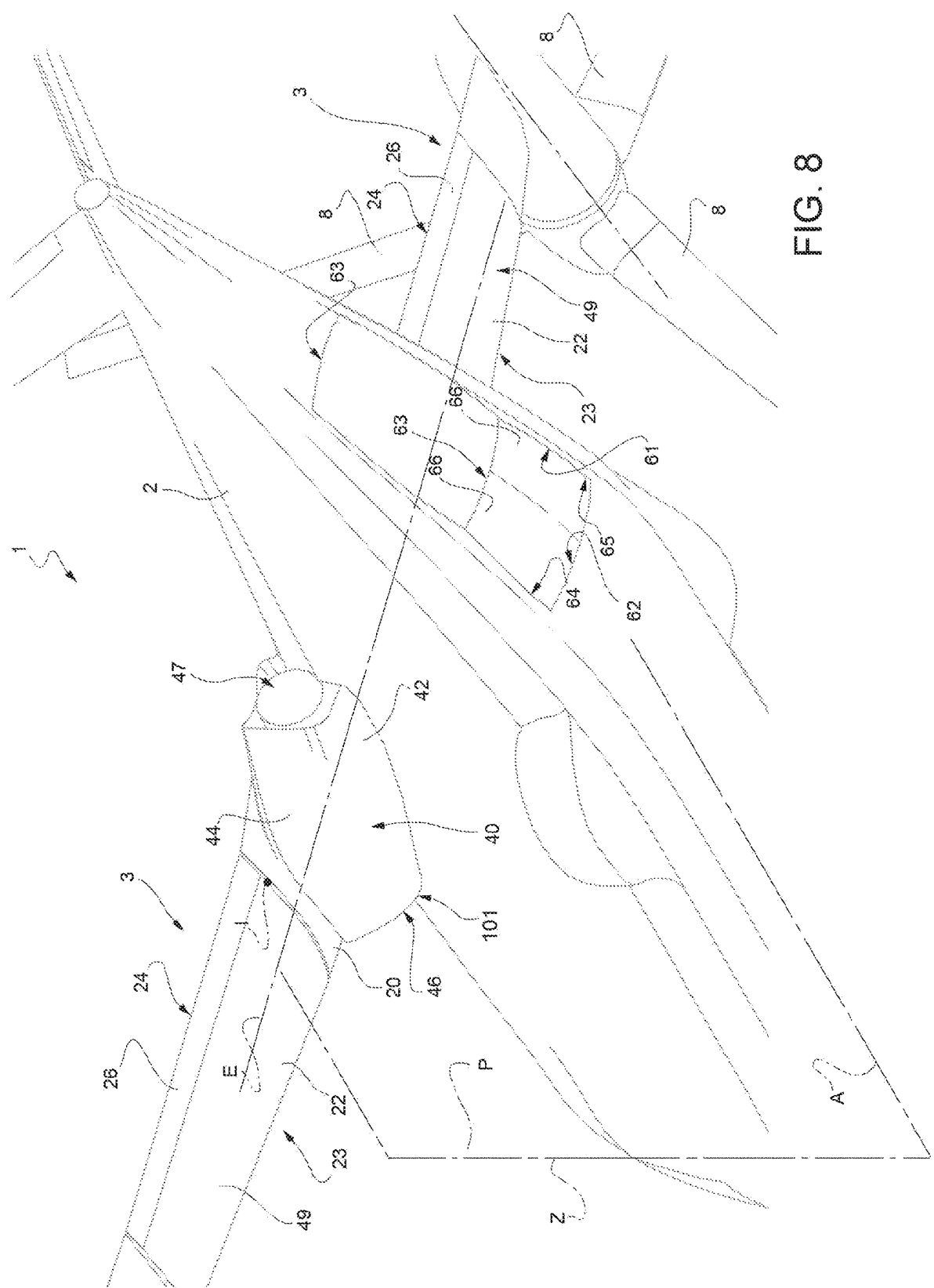
FIGS. 8 and 9 show further details of the convertiplane of FIGS. 1 to 7 on a further enlarged scale, seen in perspective from different viewpoints below.
Figure 9:
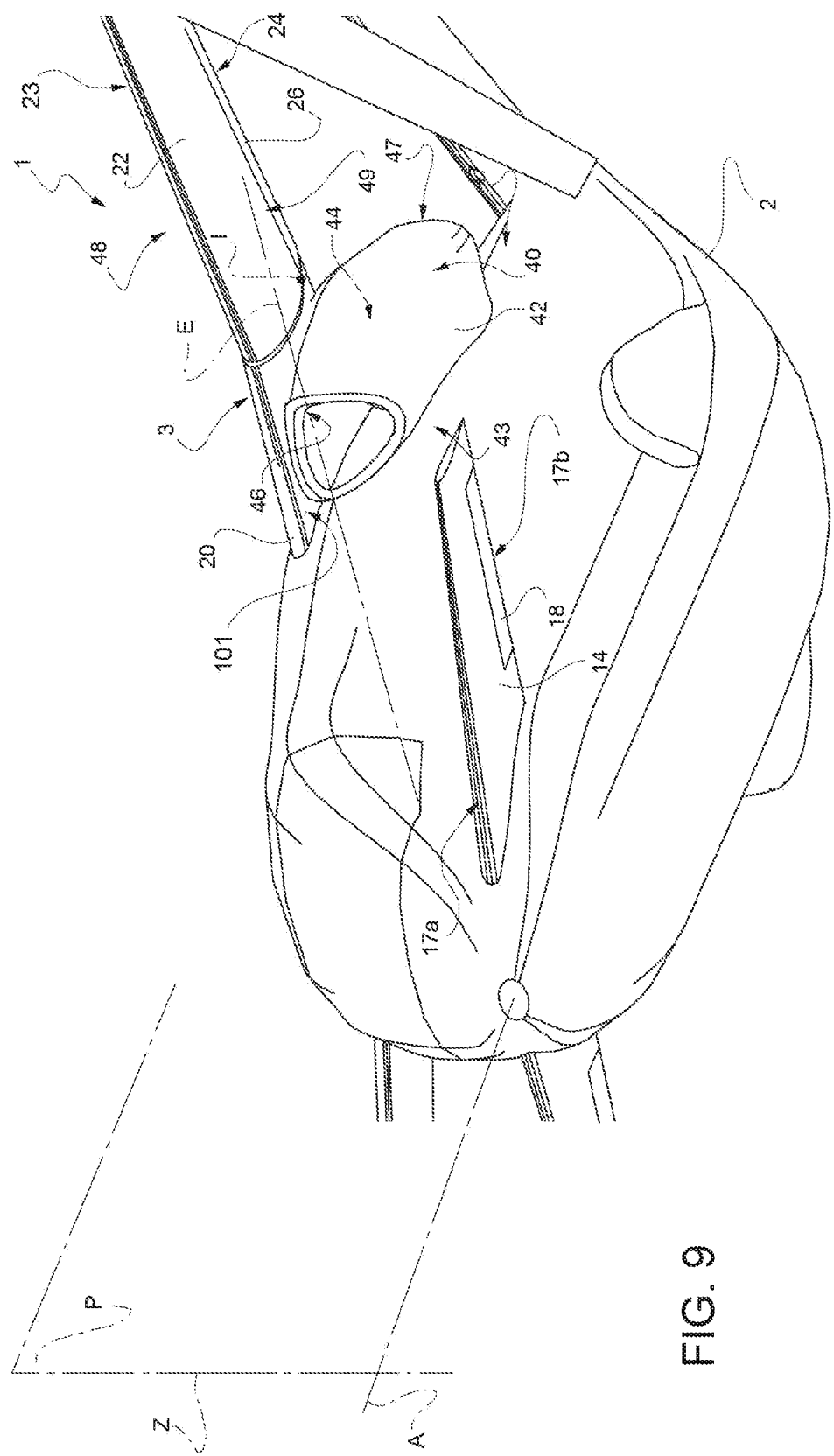
Figure 10:
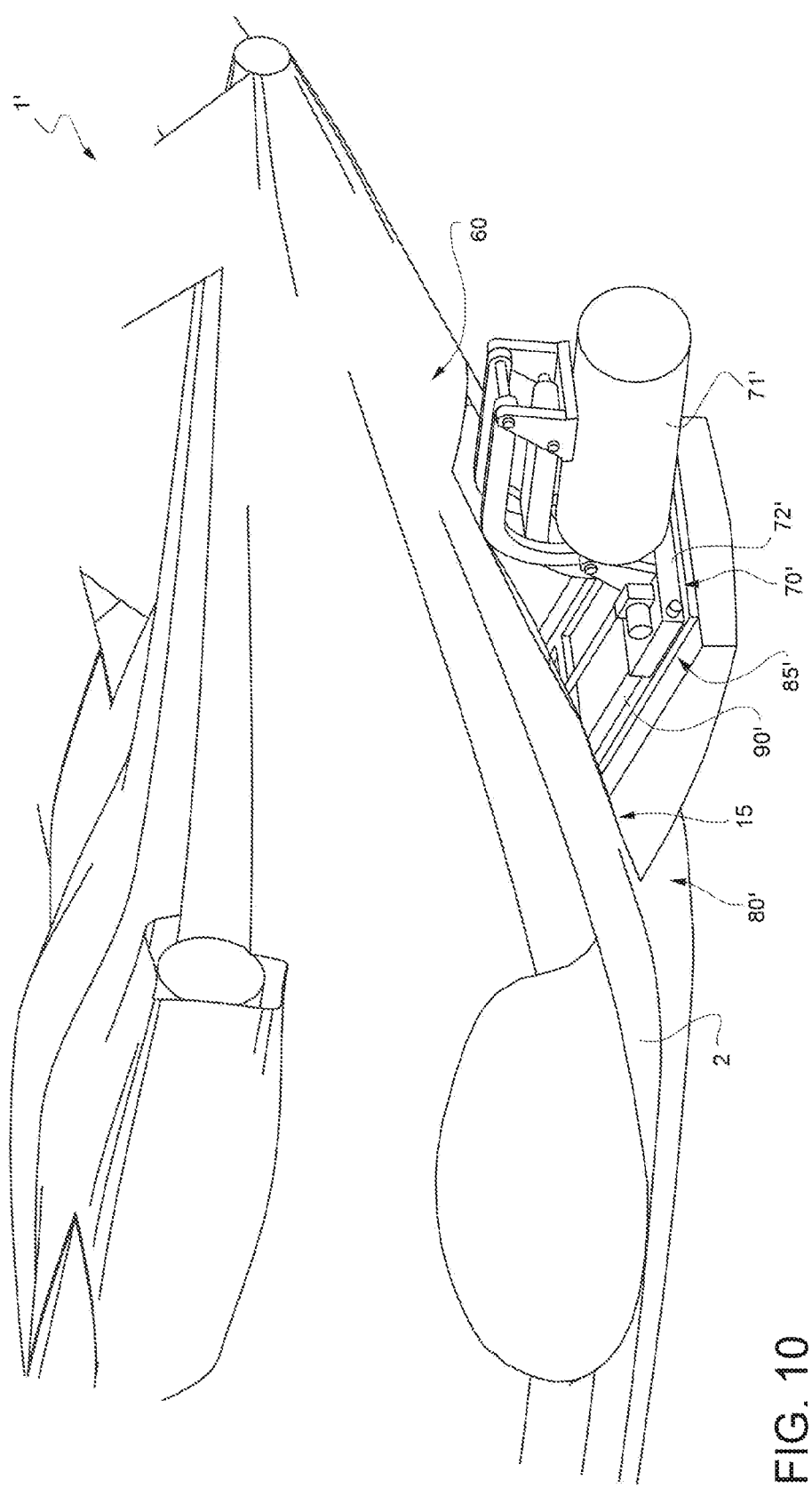
FIGS. 10 to 14 show a second embodiment of the convertiplane according to the present invention, in a sequence of operating steps.
Figure 11:
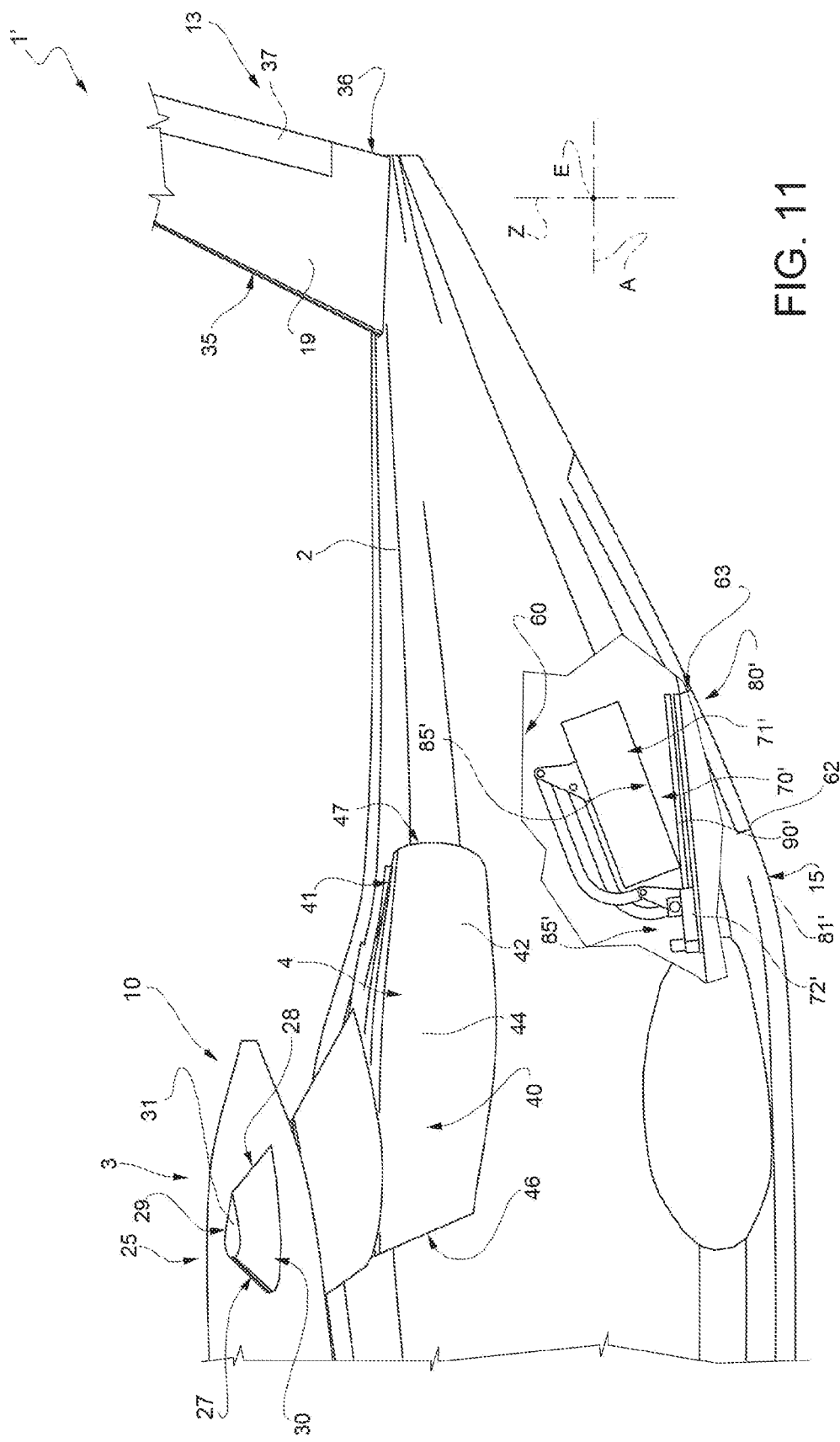

The panels 66 are normally arranged in the respective closed positions and the support element 70 is housed inside the cargo compartment 60 in the retracted position (FIGS. 4 and 8).

Figure 6:
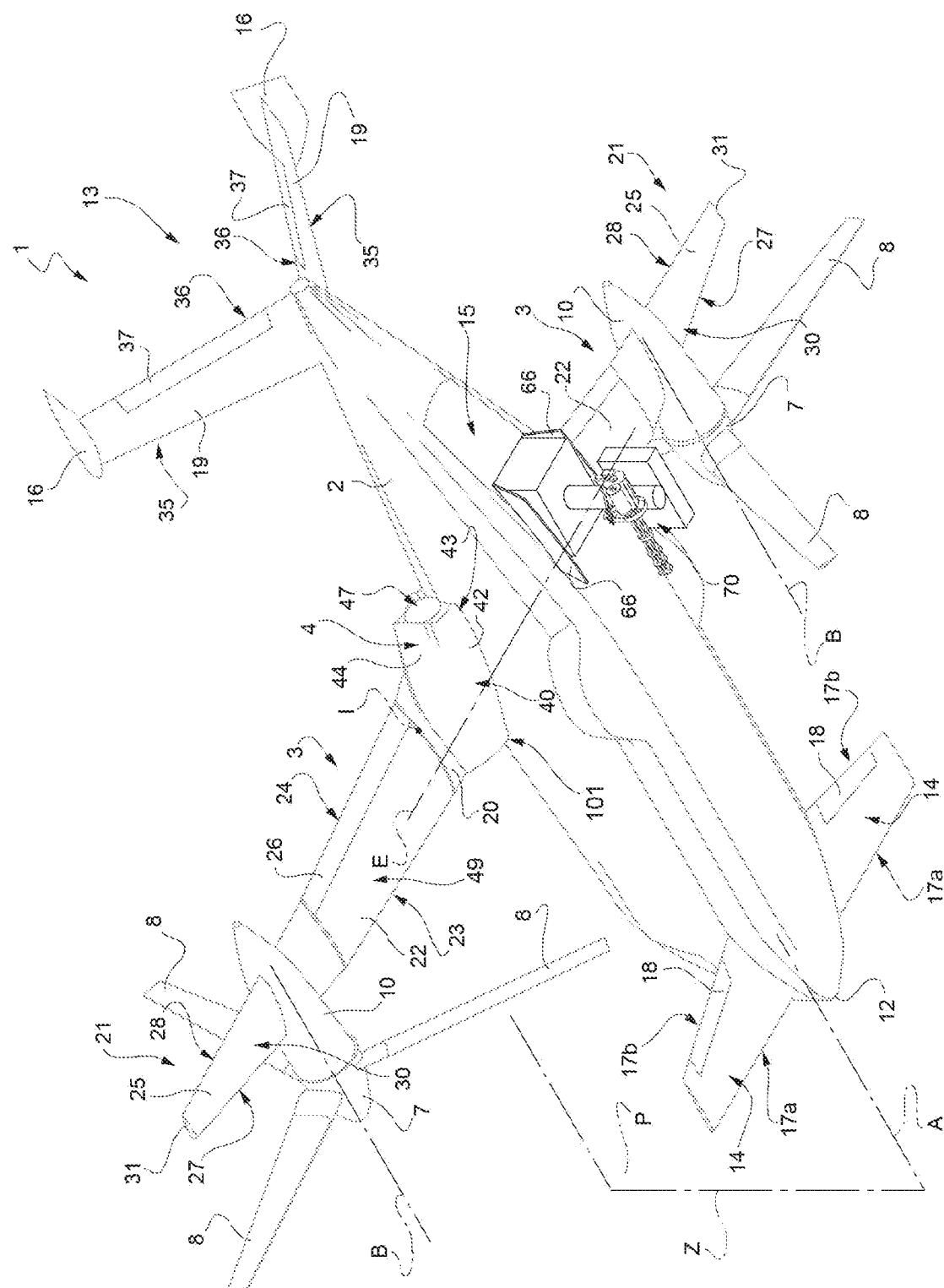
FIG. 6 shows a perspective view, from below, of the convertiplane of FIGS. 1 to 5 and the support apparatus in the second operating condition.
Figure 7:
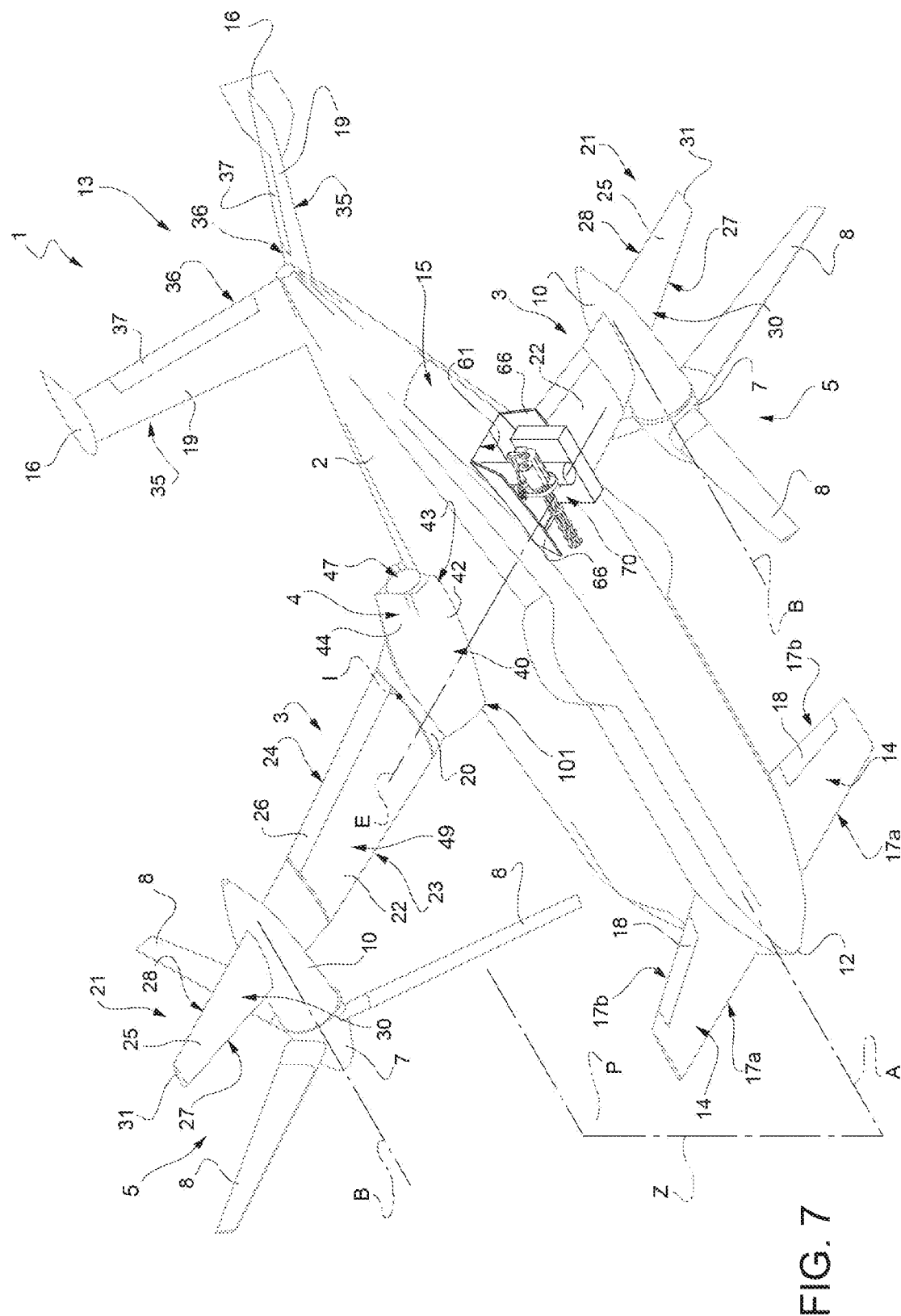
FIG. 7 shows a perspective view, from below, of the convertiplane of FIGS. 1 to 6 and the support apparatus in a third operating condition, which is intermediate between the first and the second operating conditions.

Starting from this condition, when necessary, the panels 66 are positioned in the respective open positions and the support element 70 is lowered along a vertical path until it passes through the opening 61 and reaches the extracted position (FIGS. 5, 6 and 7).

At this point, the station 71 is interposed between the rotors 5 along the axis E. In consequence, any interference between the rotors 5 and the equipment arranged on the station 71, for example a weapon or a camera, is avoided.

Afterwards, the support element 70 is returned from the extracted position to the retracted position through the opening 61 and the panels 66 are again positioned in the respective closed positions.

Referring to FIGS. 11 to 14, a further embodiment of the convertiplane 1' according to the present invention is shown.

The convertiplane 1' is similar to convertiplane 1 and will be described hereinafter only with regard to the differences; where possible, the same or equivalent parts of the aircrafts 1, 1' will be indicated with the same reference numerals.

In particular, the convertiplane 1' differs from the convertiplane 1 in that it comprises only one panel 80' instead of the panels 66.

The panel 80' is movable with respect to the fuselage 2 by rotation about the front edge 62 of the opening 61, between:
- a closed position (FIG. 11), where it is arranged contiguously with the fuselage 2, blocks the opening 61, makes contact with the edges 62, 63, 64, 65 and prevents access to the cargo compartment 60; and
- an open position (FIGS. 12, 13 and 14), where it is fixed to edge 62, extends at a progressively increasing distance from the fuselage 2 proceeding from the edge 62 towards the edge 63 and gives free access to the opening 61.

In the case shown, the panel 80' is hinged to the front edge 62 of the opening 61 and has a free end edge 81' opposite to edge 62.

When the convertiplane 1' is on the ground and the panel 80' is arranged in the open position, the panel 80' defines the load ramp for loading people and/or equipment inside the cargo compartment 60.

The support element 70' differs from the support element 70 in that it comprises a pair of slides 72' to which a station 71' is hinged about an axis H' parallel to the edges 62, 63.

Support element 70' also differs from the support element 70 in that it is movable, when the panel 80' is in the open position, along an extraction trajectory between:
- an initial position (FIG. 12), where the slides 72' are arranged adjacent to the edge 62 of the opening 61 and the station 71' is arranged above the panel 80'; and
- an intermediate position (FIG. 13), where the slides 72' are arranged on the edge 81' and the station 71' is arranged rearward of the panel 80'; and
- a final position (FIG. 14), where the slides 72' are arranged on edge 81' and the station 71' is arranged below the panel 80'.

More specifically, the support element 70' is movable, through integral translation of the station 71' and the slides 72', between the initial position and the intermediate position, and is movable through rotation of the station 71' with respect to the slides 72' between the intermediate position and the final position.

The convertiplane 1' also differs from the convertiplane 1 in that it comprises a constraint assembly 85' designed to constrain the support element 70' to the panel 80' in a movable manner.

In greater detail, the constraint assembly 85' comprises a pair of straight guides 90' parallel to each other, fixed to respective mutually opposite edges of the panel 80' and on which the slides 72' can slide, during translation of the support element 70' between the initial position and the intermediate position and vice versa when the panel 80' is in the open position.

The operation of the convertiplane 1' differs from that of the convertiplane 1 in that if it becomes necessary to use the station 71', the support element 70' is moved in the following manner after the panel 80' has been arranged in the open position.

Figure 12:
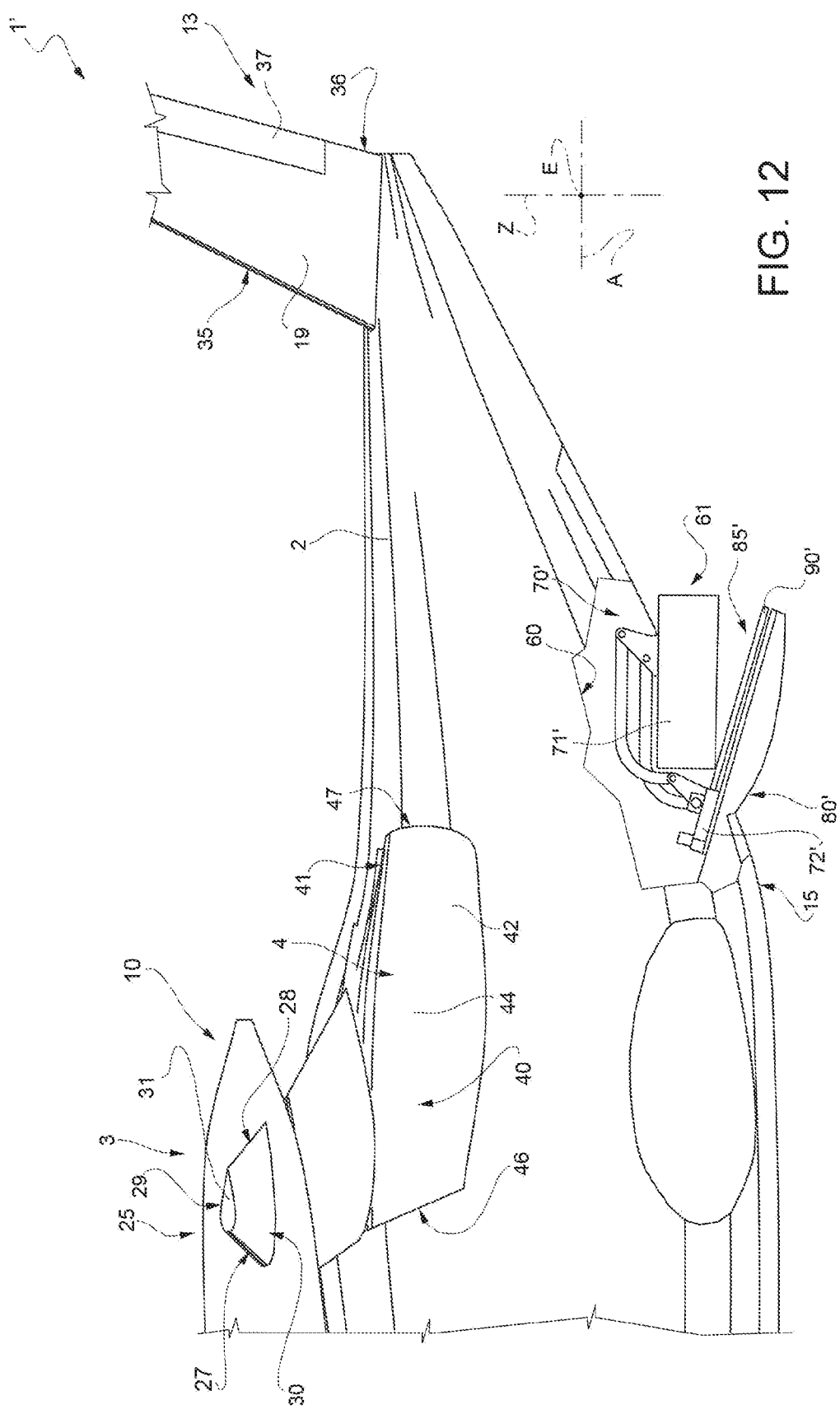
Figure 13:
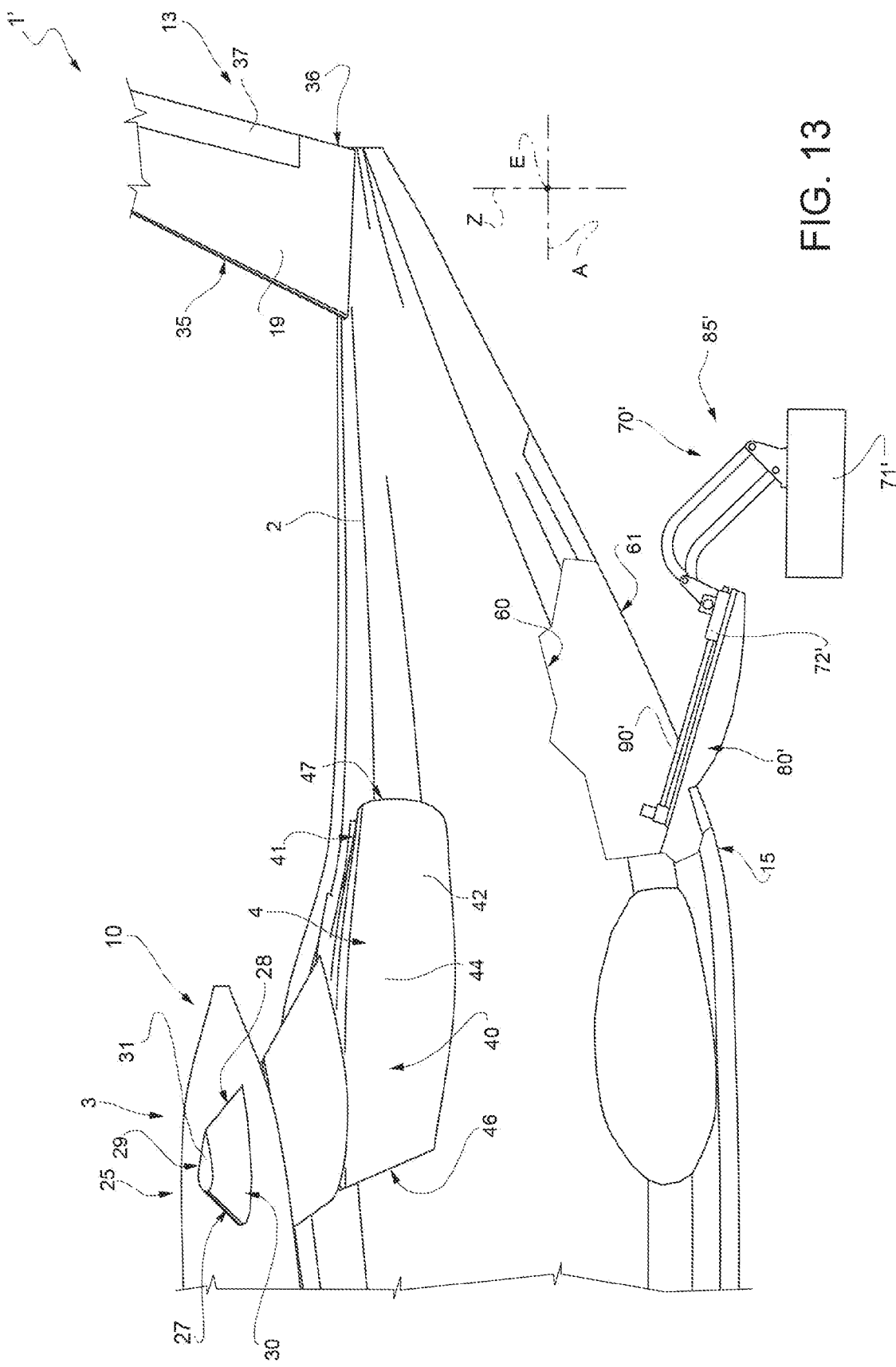

In this condition, the support element 70' is arranged in the initial position, where the slides 72' are arranged adjacent to edge 62 and the station 71' is arranged above the panel 80' (FIG. 12).

Then, the slides 72' of the support element 70' slide along the guides 90' integrally with the station 71' until the edge 81' is reached. At this point, the support element 70' is arranged in the intermediate position (FIG. 13) and the station 71' is arranged rearward to the panel 80'.

Figure 14:
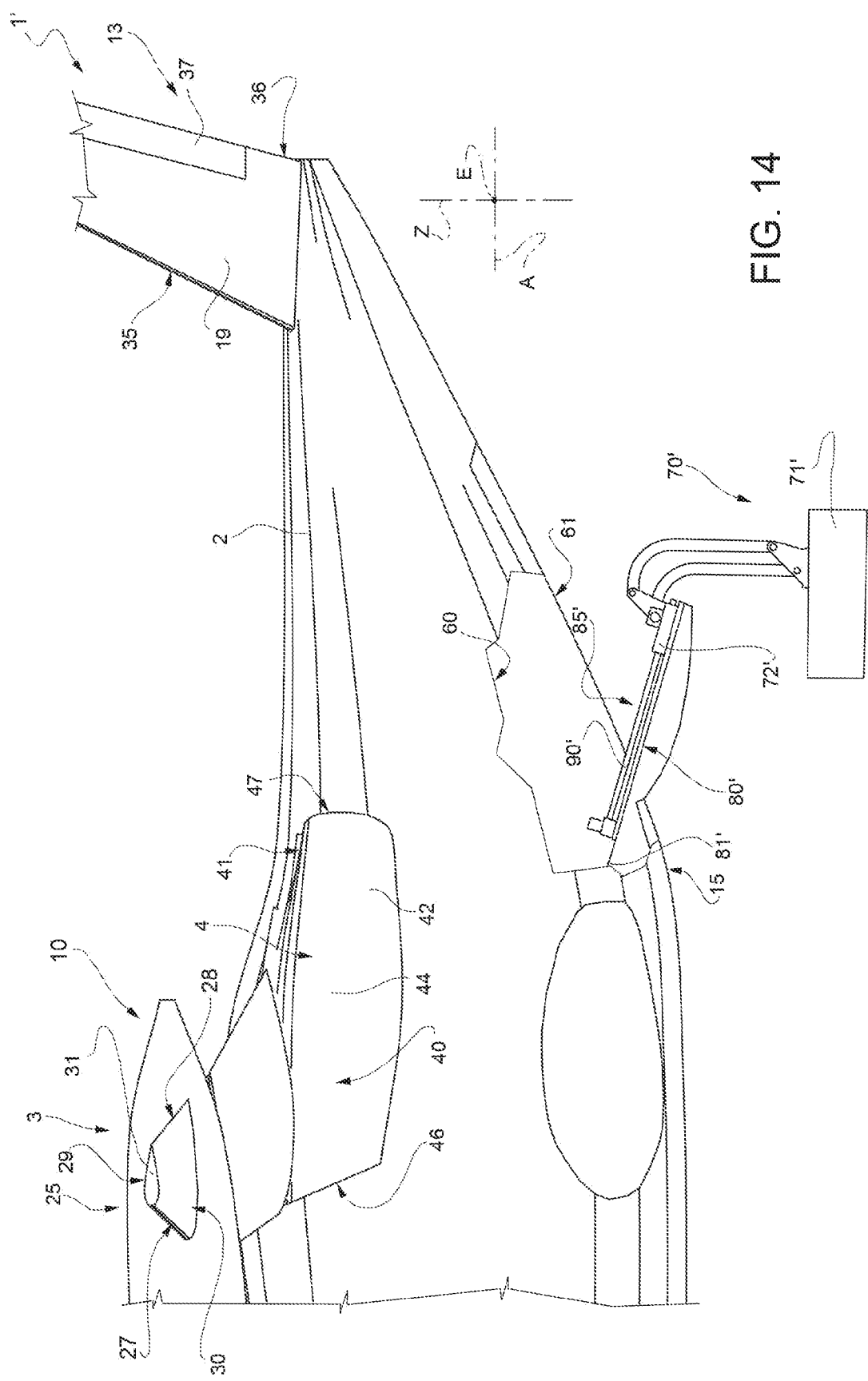
Figure 15:
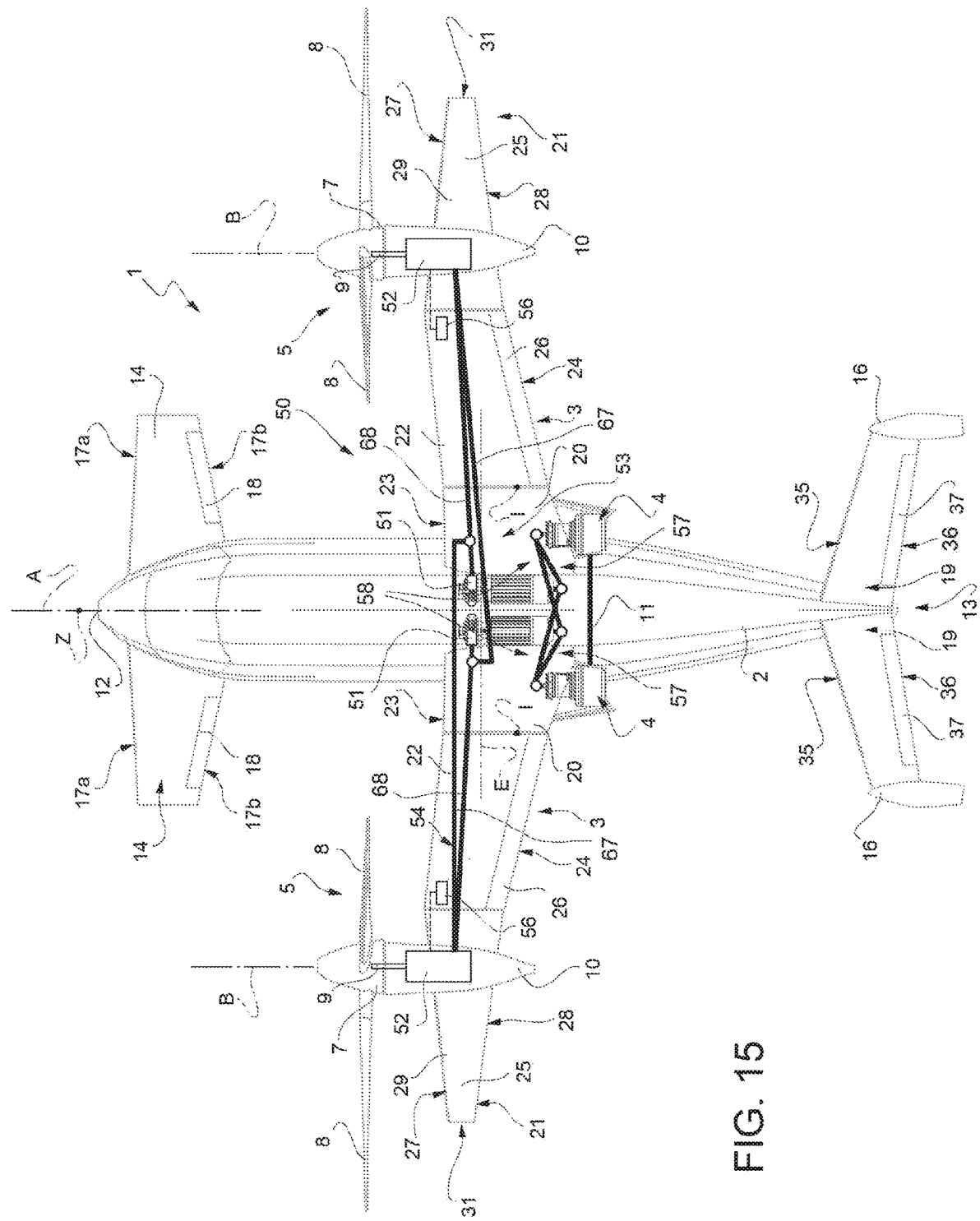
FIG. 15 is a plan view of the first embodiment of the convertiplane according to the present invention in the "helicopter" configuration, showing further details with respect to FIG. 3.

Lastly, the station 71' is turned about the axis H' around the slides 72' until it is arranged below the panel 80' (FIG. 14).

The support element 70' is returned from the final position to the intermediate position and from the latter to the initial position and the panel 80' is returned to the closed position.

Figure 16:
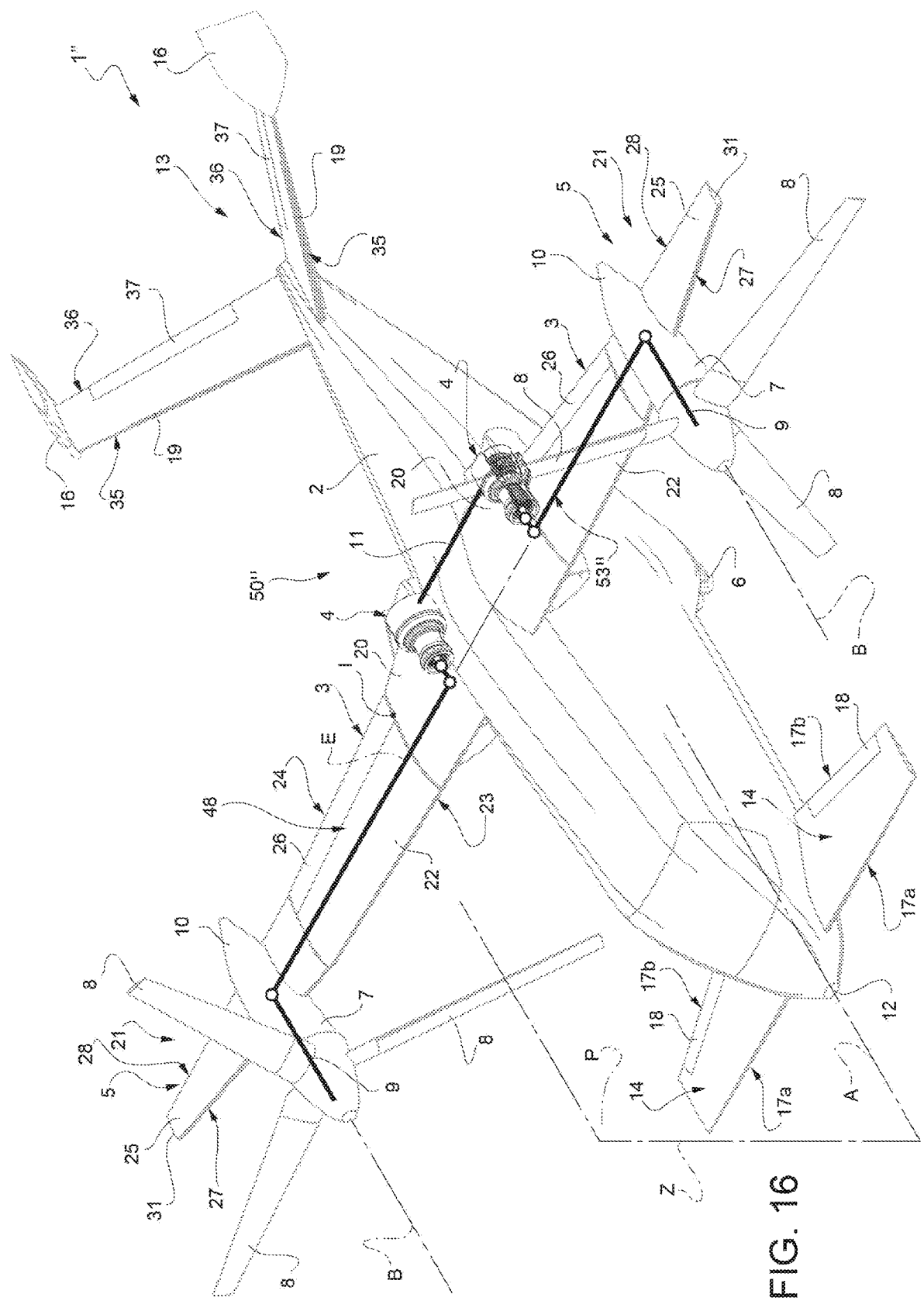
FIG. 16 is a perspective view of a third embodiment of the convertiplane according to the present invention in the "aeroplane" configuration.

Referring to FIG. 16, a third embodiment of the convertiplane 1" according to the present invention is shown.

The convertiplane 1" is similar to the convertiplane 1 and will be described hereinafter only with regard to the differences; where possible, the same or equivalent parts of the aircrafts 1, 1" will be indicated with the same reference numerals.

In particular, the convertiplane 1" differs from the convertiplane 1 in that the system 50" does not comprise the electric generators 51, the electric motors 52 and the electric transmission 54.

The convertiplane 1" also differs from the convertiplane 1 in that the mechanical transmission 53" connects the engines 4 and the masts 9 of the rotors 5.

The operation of the convertiplane 1" differs from that of the convertiplane 1 in that the thermal engines 4 directly drive the masts 9 of the rotors 5.

From an examination of the characteristics of the convertiplane 1, 1', 1" according to the present invention, the advantages that can be attained therewith are evident.

In particular, the canards 14 generate lift that contributes to balancing part of the weight of convertiplane 1, 1', 1".

In the "aeroplane" configuration, this allows generating the same value of lift with the wings 3 independently of the actual weight of the convertiplane 1, 1', 1". In fact, the changes in the actual weight of the convertiplane 1, 1', 1" are balanced by corresponding changes in the lift generated by the canards 14 and the negative lift generated by the tail portion 13 such as to ensure the desired value of resultant force along the axis Z and pitch moment about the axis E with respect to the barycentre.

Therefore, it is possible to configure the wings 3 with a lift coefficient and an angle of attack corresponding to maximum aerodynamic efficiency so as to optimise consumption of the convertiplane 1, unlike the known types of convertiplanes described in the introductory part of this description.

Moreover, in a manner completely different from what happens in traditional types of aeroplanes, there is no need to increase the surface of the wings 3 to generate an additional lift value during the take-off/landing phase.

This is because, unlike aeroplanes, the convertiplane 1, 1', 1" takes-off/lands in the "helicopter" configuration or in an intermediate configuration between the "aeroplane" and "helicopter" configurations.

In brief, the canards 14 firstly allow reducing the wing surface and, in consequence, the wingspan and chord of the wings 3 and, at the same time, optimising the aerodynamic efficiency during the phases of forward flight in the "aeroplane" configuration.

In other words, the configuration with three lifting surfaces defined by the wings 3, the canards 14 and the tail portion 13 are much more advantageous when applied to the convertiplane 1, 1', 1" rather than a conventional aeroplane, for example, of the type described in the introductory part of this description.

Secondly, the canards 14 provide additional lift that reduces the lift that must be developed by the wings 3 and so reduces the stress acting on them.

Thirdly, the canards 14 form a further lifting surface, which enables operating the convertiplane with a certain safety margin in particularly severe operating scenarios.

More specifically, the presence of canards 14 on the convertiplane 1, 1', 1" of the present invention enables increasing the survivability of the aircraft in situations where, due to unforeseeable external causes, there is partial and/or complete loss of operation, and therefore of the aerodynamic contribution, of the other aerodynamic surfaces, for example, a section of the tail portion 13 or a section of each wing 3.

Thus, the convertiplane 1, 1', 1" of the present invention advantageously allows covering every operating configuration of the predetermined flight envelope even in the event of a partial loss of aerodynamic surfaces.

Furthermore, the engines 4 are arranged below the respective wings 3 in a connection interface area between the fuselage 2 and the respective wings 3, and are connected to respective sides of the fuselage 2.

Thanks to this configuration, in the event of an emergency vertical landing, the bending moments acting on the wings 3 due to the weight of the engines 4 are drastically reduced with respect to the known types of convertiplanes described in the introductory part of this description. In addition, the interconnection shaft 11 has a particularly short length with respect to the aforementioned known solutions and is consequently subjected to lower twisting and bending moments for the same amount of transmitted torque. Finally, the position of the engines 4 particularly close to the fuselage 2 facilitates the possible folding of the wings 3 to arrange the convertiplane 1, 1', 1" in a stowage configuration, not shown, and the possible removal of accessories housed inside the wings 3 to allow the stowage of particularly bulky loads inside the wings 3. These operations are further facilitated in that portions 22 are hinged to respective portions 20 and can thus be turned about the respective axes I with respect to the respective portions 20.

The movable control surfaces 26 of the wings 3 are controlled so as to be arranged only with both in the respective neutral positions, or one in the second raised operating position and the other in the third lowered operating position, when the convertiplane 1, 1' is in the "aeroplane" configuration and it is necessary to generate roll motion about the axis A.

In other words, the movable control surfaces 26 only behave like ailerons and not like flaps in the "aeroplane" configuration of the convertiplane 1, 1', 1".

If it is necessary to vary the overall lift generated by the wings 3 while the convertiplane 1 is in the "aeroplane" configuration, it is possible to tilt the tip portions 21 of the wings 3 with the respective rotors 5 and/or aforementioned movable surfaces 25 by the same angles about the axis E.

In other words, referring to the "aeroplane" configuration, the tip portions 21 of the wings 3 perform the function normally carried out by the flaps in known types of convertiplanes.

The adjustment of the lift is thus advantageously obtained by using the tilting of the tip portions 21 of the wings 3 supporting the respective rotors 5 and advantageously eliminating the flaps from the wings 3.

The system 50 has the following advantages.

Firstly, the electric generators 51 are interposed between the electric motors 52 along the axis E and the engines 4 are arranged on respective interface corners between fuselage 2 and respective wings 3. In consequence, similarly to the interconnection shaft 11, the transmission 53 also has particularly small dimensions along the axis E and is consequently subject to lower twisting and bending moments with respect to the solutions of a known type described in the introductory part of this description.

Secondly, each engine 4 is mechanically connected to both electric generators 51 and is sized so as to be able to power both the electric generators 51 to generate a level of electric power such as to allow the correct operation of the rotors 5.

This means that in the event of failure of one of the engines 4, it is possible to preserve the correct supply of mechanical power to the rotors 5 and the correct operation of the convertiplane 1, 1', 1".

Moreover, it is possible to deactivate, or operate at a minimum speed of rotation, one of the engines 4 and only activate it only when it necessary to make supplementary electric power available for the electric generators 51.

Secondly, each electric generator 51 is connected to both the electric motors 52 and is sized so as to be able to electrically power both the electric motors 52 with the correct value of electric power, in the event of failure of the other electric generator 51.

In consequence, it is possible to preserve the correct operability of the convertiplane 1, 1', 1" in the event of failure of one of the electric generators 51, further increasing the redundancy level of the system 50.

Thirdly, the selective activation of the electric power source 56 enables being able to power the respective electric motors 52 with an increase in electric power for a limited period of time, for example 30 seconds, in the event of failure of one of the engines 4/electric generators 51, so as to enable an emergency manoeuvre to be performed.

Fourthly, each rotor 5 is driven in rotation by a relative electric motor 52. It is thus possible to manage the rotational speed of each engine 4 and the rotational speed of the relative electric motor 52 in a completely independent manner. This allows regulating the rotational speed of each rotor 5 independently of the rotational speed of the relative engine 4. It is thus possible to quickly adjust the operation of the rotors 5 to the different operating conditions of the convertiplane 1, 1', 1", while keeping the engines 4 in a minimum fuel consumption condition.

The support elements 70, 70' enable setting, during a flight configuration of the convertiplane 1, 1', 1", the station 71, 71' in a position below the fuselage 2 and interposed along the axis E between the rotors 5.

In this way, the extension of the station 71, 71' along the axis A interferes neither with the rotors 5 nor the fuselage 2.

It is thus possible to arrange a weapon on the station 71, 71' without causing any risk of damage to the convertiplane 1, 1', 1".

The panel 80' is advantageously used both as a loading ramp when the convertiplane 1' is on the ground and for constraining the support element 70' to the convertiplane 1' and allowing its movement between the initial and final positions.

It is clear that modifications and variants can be made to the convertiplane 1, 1', 1" set forth herein without departing from the scope defined in the claims.

In particular, the convertiplane 1 could land and take-off in an intermediate configuration, between the "helicopter" and "aeroplane" configuration.

In addition, each tip portion 21 might not comprise a section adjacent to the respective portion 22. In this case, each tip portion 21 would only comprise the respective rotor 5 with the respective nacelle 10 and the respective free end 31.

Furthermore, the cargo compartment 60, the opening 61 and the support element 70, 70' could be installed in a helicopter instead of in the convertiplane 1, 1', 1".

The invention claimed is:

1. A convertiplane (1, 1', 1") comprising:
    a fuselage (2) having a first longitudinal axis (A) and, in turn, comprising a nose (12) and a tail portion (13);
    a pair of monoplane wings (3) arranged on respective opposite sides of said fuselage (2), carrying respective rotors (5) and generating a first lift or negative lift value;
    at least one engine (4) operatively connected to said rotors (5); and
    at least one first lifting surface (19, 16) arranged on said tail portion (13) and generating a second lift or negative lift value;
    each said rotor (5), in turn, comprising a mast (9) rotatable about a second axis (B);
    said mast (9) of each said rotor (5) being integrally tiltable with said second axis (B) about a relative third axis (E) transversal to said second axis (B) and with respect to said fuselage (2), so as to set said convertiplane (1, 1', 1") between a helicopter configuration and an aeroplane configuration;
    each said second axis (B) being, in use, transversal to said first axis (A) of said convertiplane (1, 1', 1") in said helicopter configuration and being, in use, substantially parallel to said first axis (A) in said aeroplane configuration;
    said rotors (5) projecting from said wings (3) from the side of said nose (12) of said fuselage (2) when said convertiplane (1, 1', 1") is in said aeroplane configuration;
    said rotors (5) being arranged, in use, above said wing (3) when said convertiplane (1, 1', 1") is in said helicopter configuration;
    said convertiplane (1, 1', 1") landing and taking-off, in use, in said helicopter configuration or in an intermediate configuration between said aeroplane and helicopter configurations;
    characterised in that it comprises a pair of canards (14) arranged at said nose (12) of said fuselage (2) and defining respective second lifting surfaces adapted to generate a third lift Z or negative lift;
    each said wing (3), in turn, comprising:
    a first portion (20), fixed with respect to said fuselage (2);
    a second tip portion (21), integrally tiltable with the relative said mast (9) about the relative said third axis (E); and
    a third intermediate portion (22), which is interposed between the respective said first portion (20) and the respective said tip portions (21).

2. The convertiplane according to claim 1, characterised in that it comprises at least two said engines (4) operatively connected to respective said rotors (5);
    each said engine (4) being interposed between the relative said rotor (5) and said fuselage (2) along the relative said wing (3);
    said convertiplane (1, 1', 1") further comprising an interconnection shaft (11) interposed between said engines (4) and carried by said fuselage (2) for a greater part of its length.

3. The convertiplane according to claim 1, characterised in that the overall space occupied in plan view by said tail portion (13) is at least 5%, preferably at least 10%, of the overall space occupied by said wings (3).

4. The convertiplane according to claim 3, characterized in that
    said third intermediate portion (22) of each wing (3) is hinged to said first portion (20) of the respective wing (3) about a fourth axis (I);
    said fourth axes (I) being incident with one another in a longitudinal plane (P) of said convertiplane (1) comprising said first axis (A), or are skew, or are parallel to each other.

5. The convertiplane according to claim 1, characterised in that said canards (14), said wings (3) and said tail portion (13) extend at respective progressively increasing distances from an undercarriage (6) of said convertiplane (1, 1', 1"), proceeding along said first axis (A) from said canards (14) towards said tail portion (13).

6. The convertiplane according to claim 4, characterised in that said first portion (20) of each said wing (3) comprises a first movable control surface (26) selectively movable with respect to the relative said wing (3, 3') between:
    a related first raised operating position, with which a first lift value of the relative said wing (3) is associated;
    a related second lowered operating position, with which a second lift value, distinct from said first value, of the relative said wing (3) is associated; and
    a related third lowered operating position coincident with or separate from the related said second lowered operating position;
    said control surfaces (26) being controllable so as to be arranged with one in the related first raised operating position and the other in the related said second lowered operating position in said aeroplane configuration to control the roll of said convertiplane (1) about said first axis (A);
    said control surfaces (26) being both arranged in the respective third lowered operating positions in said helicopter configuration;
    said second tip portion (21) being tiltable by an angle between 5 and 10 degrees about said third axis (E) so as to arrange the second axis (B) of the relative said rotor (5) tilted with respect to said first axis (A) and change the lift generated by said wing (3), when said convertiplane (1) is in said aeroplane configuration.

7. The convertiplane according to claim 1, characterised in that said fuselage (2) comprises a cargo compartment (60) and at least one movable panel (66, 80') delimiting said cargo compartment (60);
   said panel (66, 80') being selectively movable between:
      a closed position, in which it closes said cargo compartment (60); and
      an open position, in which it gives access to said cargo compartment (60) from the outside;
   said convertiplane (1, 1', 1") further comprising a support element (70, 70') housed inside said cargo compartment (60) in a retracted position when said movable panel (66, 80') is in said closed position and movable to an extracted position outside of said cargo compartment (60);
   said support element (70, 70') comprising a station (71, 71') for equipment; said station (71, 71') being interposed between said rotors (5) along said third axis (E) and offset from said fuselage (2) along said first axis (A), when said support element (70, 70') is in said extracted position.

8. The convertiplane according to claim 7, characterised in that said support element (70) is constrained in a sliding manner inside said cargo compartment (60) and is movable on a straight translation path along a fifth axis (Z), between said retracted and extracted positions, when panel (66) is, in use, in said open position;
   said fifth axis (Z) being transversal to a plane defined by said first and third axes (A, E).

9. The convertiplane according to claim 7, characterised in that said panel (80') defines a loading ramp when it is arranged in said open position and said convertiplane (1, 1', 1") is, in use, on the ground;
   said support element (70') being constrained in a movable manner to said panel (80');
   said support element (70') and said station (71') being integrally slidable with respect to one another along a translation path with respect to said panel (80'), between an initial position and an intermediate position, when said panel (80') is in said open position;
   said station (71') being arranged in said intermediate position externally to said cargo compartment (60) and, in use, rearward of said panel (80');
   said station (71') being hinged onto said support element (70') and being rotatable about the support element (70') between said intermediate position and a final position in which the station (71') is arranged outside said cargo compartment (60) and, in use, below said panel (80'), when said panel (80') is in said open position.

10. The convertiplane according to claim 1, characterised in that it comprises:
   a pair of electric motors (52) operatively connected to respective said rotors (5) and adapted to drive the rotors (5) in rotation;
   a pair of electric generators (51) electrically connected to respective said electric motors (52) and operatively connected to respective said engines (4);
   said engines (4) being thermal engines.

11. The convertiplane according to claim 10, characterised in that said electric generators (52) are interposed between said engines (4) along said third axis (E); and/or
   characterised in that said electric motors (52) are integrally tiltable with the respective said rotors (5) about the respective said third axes (E).

12. The convertiplane according to claim 10 or 11, characterised in that it comprises, for each said rotor (5):
   a nacelle (10) housing the rotor (5) and the respective electric motor (52); and
   a hub (7) operatively connected to the respective mast (9) and mechanically connected to the respective electric motor (52).

13. The convertiplane according to claim 10, characterised in that each said engine (4) is operatively connected to both said electric generators (51) and is sized so as to provide a level of mechanical power necessary for powering both said electric generators (51) in the event of failure of the other said engine (4); and/or
   characterised in that each said electric generator (51) is operatively connected to both said electric motors (52), and is sized so as to provide a level of electric power necessary for powering both said electric motors (52) in the event of failure of the other said electric generator (51).

14. The convertiplane according to claim 10, characterised in that it comprises an electric energy source (56) operatively connectable to at least one of said electric motors (52) and operable, for a predetermined time, to provide additional electric power to said at least one of said electric motors (52).

15. The convertiplane according to claim 1, characterized in that:
   each said tip portion (21) supports respective said rotor (5) and defines a respective aerodynamic surface (25);
   each said tip portion (21), said relative surface (25) and said relative rotor (5) are tiltable about a relative third axis (E) integrally with said relative rotor (5);
   said surfaces (25) define respective extensions of respective said first portions (20) and said intermediate portions (22), when said convertiplane (1) is in said aeroplane configuration;
   a leading edge (27) of each surface (25) being arranged in front of a trailing edge (28) of same said surface (25), proceeding along said first axis (A), when said convertiplane (1) is in said aeroplane configuration.

16. The convertiplane according to claim 15, characterized in that the chord of each said surface (25) being arranged orthogonally to said first axis (A) and said third axis (E), when said convertiplane (1) is in said helicopter configuration.

17. The convertiplane according to claim 16, characterized in that each said engine (4) being arranged at a connection interface between a relative side of said fuselage (2) and relative said wing (3).

* * * * *